US012783722B2

(12) United States Patent
Barak et al.

(10) Patent No.: US 12,783,722 B2
(45) Date of Patent: Nov. 3, 2026

(54) PREVENTING THE DISCLOSURE OF SENSITIVE INFORMATION IN ATTEMPTS TO UTILIZE GENERATIVE ARTIFICIAL INTELLIGENCE (AI) THROUGH A CHAT-STYLE INTERFACE

(71) Applicant: Proofpoint, Inc., Sunnyvale, CA (US)

(72) Inventors: Nir Barak, Karmei Yosef (IL); Boris Traktirnik, Winter Garden, FL (US)

(73) Assignee: Proofpoint, Inc., Sunnyvale, CA (US)

( * ) Notice: Subject to any disclaimer, the term of this patent is extended or adjusted under 35 U.S.C. 154(b) by 24 days.

(21) Appl. No.: 18/892,806

(22) Filed: Sep. 23, 2024

(65) Prior Publication Data

US 2026/0003999 A1 Jan. 1, 2026

Related U.S. Application Data

(60) Provisional application No. 63/664,887, filed on Jun. 27, 2024.

(51) Int. Cl.

| | |
|---|---|
| ***G06F 21/62*** | (2013.01) |
| ***G06F 9/451*** | (2018.01) |
| ***G06F 9/54*** | (2006.01) |
| ***G06F 16/955*** | (2019.01) |
| ***G06F 21/60*** | (2013.01) |
| ***G06F 40/30*** | (2020.01) |

(Continued)

(52) U.S. Cl.
CPC .......... *G06F 21/6245* (2013.01); *G06F 9/451* (2018.02); *G06F 9/54* (2013.01); *G06F 16/955* (2019.01); *G06F 21/606* (2013.01); *G06F 40/30* (2020.01); *H04L 51/212* (2022.05); *H04L 51/224* (2022.05); *H04L 63/02* (2013.01)

(58) Field of Classification Search
CPC ........ G06F 21/6245; G06F 9/451; G06F 9/54; G06F 16/955; G06F 21/606; G06F 40/30; G06F 2209/545; G06F 9/547; H04L 51/212; H04L 51/224; H04L 63/02; G06N 3/0475; G06N 3/094; G06N 20/00
See application file for complete search history.

(56) References Cited

U.S. PATENT DOCUMENTS

| | | | |
|---|---|---|---|
| 6,978,378 | B1 | 12/2005 | Koretz |
| 11,388,250 | B1 | 7/2022 | Barak |

(Continued)

*Primary Examiner* — Hany S. Gadalla
(74) *Attorney, Agent, or Firm* — Sheehan Phinney; Bass & Green PA

(57) ABSTRACT

A computer-implemented method is disclosed that includes receiving a notification that a submit option has been selected on a chat interface to a tool (e.g., a generative artificial intelligence (AI) tool) hosted at a remote network destination, cancelling the transmission of text from the chat interface to the generative AI tool is canceled in response to the notification. Text, initially intended to be submitted to the generative artificial intelligence tool from the chat interface, is obtained and scanned to determine whether the content of the text contains sensitive information. Typically, this determination is made based, at least in part, on the content of the text. Depending on an outcome of the determination, the computer either enables or prevents transmittal of the text from the chat interface to the generative artificial intelligence tool. If enabled, the computer typically and automatically reselects the submit option (without further involvement from the user).

18 Claims, 14 Drawing Sheets

(51) Int. Cl.
*H04L 9/40* (2022.01)
*H04L 51/212* (2022.01)
*H04L 51/224* (2022.01)

(56) References Cited

U.S. PATENT DOCUMENTS

| | | | | |
|---|---|---|---|---|
| 11,449,603 | B2 | 9/2022 | Tietz | |
| 11,775,670 | B2 | 10/2023 | Ziv | |
| 11,869,031 | B2 | 1/2024 | Glynn-Udrow | |
| 12,231,380 | B1 * | 2/2025 | Rodgers | G06F 40/30 |
| 12,273,392 | B1 | 4/2025 | Yang | |
| 12,511,437 | B1 * | 12/2025 | Tsao | G06F 21/6263 |
| 2017/0004316 | A1 | 1/2017 | Walton | |
| 2020/0228561 | A1 | 7/2020 | Petry | |
| 2022/0210154 | A1 | 6/2022 | Gupta | |
| 2023/0409352 | A1 | 12/2023 | Laforge | |
| 2024/0289448 | A1 * | 8/2024 | Cohen | G06F 21/566 |
| 2025/0131126 | A1 | 4/2025 | Gnanesakaran | |
| 2025/0209200 | A1 * | 6/2025 | Paes | G06F 21/6245 |
| 2025/0258938 | A1 * | 8/2025 | Palladino | G06F 21/6227 |
| 2025/0278574 | A1 | 9/2025 | Salim | |
| 2025/0371261 | A1 | 12/2025 | Czerkies | |

* cited by examiner

PREVENTING THE DISCLOSURE OF SENSITIVE INFORMATION IN ATTEMPTS TO UTILIZE GENERATIVE ARTIFICIAL INTELLIGENCE (AI) THROUGH A CHAT-STYLE INTERFACE

CROSS-REFERENCE TO RELATED APPLICATIONS

The present application claims the benefit of priority to U.S. Provisional Patent Application No. 63/664,887, entitled Preventing Disclosure of Sensitive Information in Utilizing Generative Artificial Intelligence (AI), which was filed on Jun. 27, 2024. The disclosure in the prior application is incorporated by reference herein in its entirety. The present application also is related to an application entitled Preventing Disclosure of Sensitive Information in Attempting to Utilize Generative Artificial Intelligence (AI) Through an In-line Interface, and to an application entitled Preventing Disclosure of Sensitive Information in Attempting to Utilize Generative Artificial Intelligence (AI) Through a Web Browser Interface, each of which also claim the benefit of priority to U.S. Provisional Patent Application 63/664,887.

BACKGROUND

Generative AI technologies are growing in popularity and are expected to have increasing relevance in the coming years in the workplace and beyond. Generative AI technologies can be deployed in a variety of different ways and are typically accessed by end users from endpoint devices that are located away from the servers that host the generative AI technologies. Employees or other members of an organization, for example, may access generative AI technologies that are hosted on servers that are located beyond the firewalls and/or other protective network security measures deployed by the organization. These employees and organization members may realize great benefits from interacting with and utilizing such technologies, but doing so has the potential to expose information that the organization deems to be confidential or proprietary (hereinafter, sensitive data) beyond the reach of any protective network security measures deployed by the organization. Organizations, of course, have an interest in preserving and protecting the confidentiality and proprietary nature of such sensitive data, whether or not generative AI technologies are being utilized.

SUMMARY OF THE INVENTION

In a typical implementation, the systems and techniques disclosed herein, strike a balance between facilitating robust access to generative AI technologies and minimizing the risk of compromising the confidential nature of sensitive information when utilizing such generative AI technologies. The systems and techniques disclosed herein strike this advantageous balance in a variety of different types of computer systems including for example, those that provide a chat-style generative AI interface, those that provide an interface that facilitates access to generative AI from directly within a document created by a computer application or development platform executing on an end user device, and/or those that provide a generative AI interface in a web browser. In each of these instances, information must be transmitted to the server(s) hosting the generative AI technologies in order for the generative AI to provide a desired response. Moreover, in each instance, if the information is deemed to include any sensitive information, then the transmission may be blocked to protect the sensitive information.

In one aspect, a computer-implemented method is disclosed of regulating disclosure of sensitive information while attempting to utilize a tool (e.g., a generative artificial intelligence tool) hosted (e.g., on one or more servers) at a remote network destination. The method includes receiving a notification, at a computer-implemented endpoint agent deployed on an endpoint device, that a submit option has been selected on a chat interface to a generative artificial intelligence tool that is hosted at a remote network destination (e.g., beyond any firewalls or other network security measures deployed to protect data on the endpoint device or its associated private network). The transmission of text from the chat interface to the generative artificial intelligence tool is canceled, typically automatically, in response to receiving the notification. Text, initially intended to be submitted to the generative artificial intelligence tool from the chat interface, is obtained (e.g., at the computer-implemented endpoint agent). A computer-implemented scanning engine determines whether the text intended to be submitted to the generative artificial intelligence tool from the chat interface contains sensitive information. Typically, this determination is made based, at least in part, on the content of the text. However, in some implementations, other information (e.g., user profile information, endpoint device location, etc.) about the associated user session may be used as well. Depending on an outcome of the determination, the computer either: enables transmittal of the text from the chat interface to the generative artificial intelligence tool or prevents the transmittal of the obtained text from the chat interface to the generative artificial intelligence tool.

In some implementations, enabling the transmittal of the text from the chat interface to the generative artificial intelligence tool occurs in response to a determination that the text intended to be submitted to the generative artificial intelligence tool from the chat interface does not contain sensitive information. Moreover, enabling the transmittal of the text may include sending a signal from the endpoint agent to the chat interface to automatically reselect the submit option, without involvement from a human user. In such implementations, the chat interface is configured to automatically reselect the submit option (e.g., click to submit) and thereby transmit the text from the chat interface to the generative artificial intelligence tool in response to receiving the signal from the endpoint agent to automatically reselect the submit option. The generative artificial intelligence tool typically is configured to receive text transmitted by the chat interface, generate feedback in response to the transmitted text, and transmit a response to the chat interface based on the generated feedback. A human end user may utilize the generated feedback and update a document (e.g., one where the user is developing computer code, or the like) accordingly. When the human end user updates the document, the computer receives the update(s) to the document, via one or more human machine interfaces (e.g., keyboard, mouse, touchscreen, etc.) and, in such instances, any such updates typically are based upon, or incorporate, one or more portions of the response from the generative AI tool.

In certain implementations, preventing the transmittal of text from the chat interface to the generative artificial intelligence tool occurs in response to a determination that the text intended to be to be submitted to the generative artificial intelligence tool from the chat interface contains sensitive information. In some implementations, preventing the transmittal of the text from the chat interface to the generative artificial intelligence tool includes leaving the transmission of text from the chat interface to the generative artificial intelligence tool in a canceled state. In some implementations, the text that is prevented from being transmitted to the generative AI tool is stored in computer-based memory (e.g., in cache). Typically, if transmittal of text is prevented, a notification may be sent (e.g., by the endpoint agent) that the text from the chat interface has been blocked from being submitted to the generative artificial intelligence tool. This notification may be produced in a manner that is accessible by the user who attempted to submit the text to the generative AI tool, or by any other person (e.g., manager and/or network administrator within the company) via email, text, web or application portal, or any other electronic communication means.

Determining whether the content of the text includes sensitive information may be done in any number of possible ways. In one example, data is stored, in computer-based memory, defining one or more rules for determining whether a particular section of text includes sensitive information. These rules may include, for example, a list of words or phrases, that, if present in the content of the text, would lead to a determination that the text contains sensitive information. Likewise, in such implementations, the absence of any of the listed words or phrases might lead to a determination that the text does not contain sensitive information. A scanning engine may be configured to apply the one or more rules in the computer-based memory (e.g., by comparing the stored words and/or phrases to the words and/or phrases in the content of the text) to determine whether the text intended to be to be submitted to the generative artificial intelligence tool from the chat interface contains sensitive information.

The endpoint device (i.e., the computer from which the human user is attempting to access and utilize generative AI technology) is within an organization's private network (and protected by a firewall and/or other protective network security measures from an external network). In some such implementations, the generative artificial intelligence tool is hosted by one or more servers at the remote network destination outside of the organization's private network (e.g., beyond the firewall and/or other protective network security measures implemented by the organization).

In another aspect, a system includes a computer that comprises a computer processor and computer-based memory operatively coupled to the computer processor. The computer-based memory stores computer-readable instructions that, when executed by the computer processor, cause the computer to regulate disclosure of sensitive information when attempting to utilize generative artificial intelligence by utilizing a computer-implemented method. As discussed above, the computer-based method includes receiving a notification, at a computer-implemented endpoint agent deployed on an endpoint device, that a submit option has been selected on a chat interface to a generative artificial intelligence tool that is hosted at a remote network destination (e.g., beyond any firewalls or other network security measures deployed to protect data on the endpoint device or its associated private network). The transmission of text from the chat interface to the generative artificial intelligence tool is canceled, typically automatically, in response to receiving the notification. Text, initially intended to be submitted to the generative artificial intelligence tool from the chat interface, is obtained (e.g., at the computer-implemented endpoint agent). A computer-implemented scanning engine determines whether the text intended to be to be submitted to the generative artificial intelligence tool from the chat interface contains sensitive information. Typically, this determination is made based, at least in part, on the content of the text. However, in some implementations, other information (e.g., user profile information, endpoint device location, etc.) about the associated user session may be used as well. Depending on an outcome of the determination, the computer either: enables transmittal of the text from the chat interface to the generative artificial intelligence tool or prevents the transmittal of the obtained text from the chat interface to the generative artificial intelligence tool.

In yet another aspect, a non-transitory computer readable medium is disclosed that has stored thereon computer-readable instructions that, when executed by a computer-based processor, cause the computer-based processor to regulate disclosure of sensitive information when attempting to utilize generative artificial intelligence with a process. As discussed above, the process includes receiving a notification, at a computer-implemented endpoint agent deployed on an endpoint device, that a submit option has been selected on a chat interface to a generative artificial intelligence tool that is hosted at a remote network destination (e.g., beyond any firewalls or other network security measures deployed to protect data on the endpoint device or its associated private network). The transmission of text from the chat interface to the generative artificial intelligence tool is canceled, typically automatically, in response to receiving the notification. Text, initially intended to be submitted to the generative artificial intelligence tool from the chat interface, is obtained (e.g., at the computer-implemented endpoint agent). A computer-implemented scanning engine determines whether the text intended to be to be submitted to the generative artificial intelligence tool from the chat interface contains sensitive information. Typically, this determination is made based, at least in part, on the content of the text. However, in some implementations, other information (e.g., user profile information, endpoint device location, etc.) about the associated user session may be used as well. Depending on an outcome of the determination, the computer either: enables transmittal of the text from the chat interface to the generative artificial intelligence tool or prevents the transmittal of the obtained text from the chat interface to the generative artificial intelligence tool.

In some implementations, one or more of the following advantages are present.

For example, the systems and techniques disclosed herein may facilitate the thorough visibility of data leaving the organization. The systems and techniques may monitor all transmissions (e.g., chat transmissions, etc.) performed when utilizing and/or attempting to access generative AI. The potential disclosure of sensitive information in an attempted utilization of generative AI may be detected utilizing a variety of data including, for example, one or more of access tool utilized, user session information (e.g., user identity and profile information including role within organization, location of end user device, document storage location, etc.), and/or data (e.g., key words, etc.) inside a chat control or other generative AI interface. Alerts may be generated and provided to interested parties (e.g., network administrators, organization executives, etc. through email or other type of messaging accessible from an end point device within the end user's organization's computer network). The systems and techniques disclosed may be implemented in a non-intrusive manner and deployed, at least in part, with a local mechanism to detect and prevent sharing certain types of information, beyond the boundaries of network security protective measures.

In some implementations, the systems and techniques may be adapted so as to suggest to an end user a safe alternative to a prompt or request for generative AI feedback that contains sensitive information and submit that safe alternative to the generative AI technology on behalf of the user, either automatically, or in response to a user action (e.g., a mouse click on an onscreen button) indicating acceptance by the end user of the proposed alternative. Moreover, in a typical implementation, the systems and techniques disclosed herein may prevent sensitive data being sent to generative AI technologies before that sensitive data even leaves the application itself (data is not submitted if not allowed).

Typical implementations enable and facilitate a high level of AI-assisted business productivity without compromising security. The systems and techniques typically are deployed as a light-weight and non-intrusive solution. Visibility may be provided across an organization about the usage of GEN AI. In some implementations, GEN AI chat info may appear inside a user session, and the system may be configured to capture user session information and/or screenshots or sequences indicating the end user's activity at the end point device, so as to provide context as to what was done before and after putting information in the chat interface, as well as the chat history itself inside the user session.

Additionally, and especially for systems that provide in-line access to generative AI (alone or in conjunction with chat and/or other options) the systems and techniques disclosed herein may provide thorough visibility to data leaving the organization. Moreover, the systems and techniques typically monitor all in-line suggestions provided with a GEN AI tool. When data shared with GEN AI tools detect and alert based on GEN AI tool info, user session info, and data inside the chat control, or sent via the in-line option.

Other features and advantages will be apparent from the description and drawings, and from the claims.

BRIEF DESCRIPTION OF THE DRAWINGS

Like reference characters refer to like elements.

DETAILED DESCRIPTION

Figure 1:
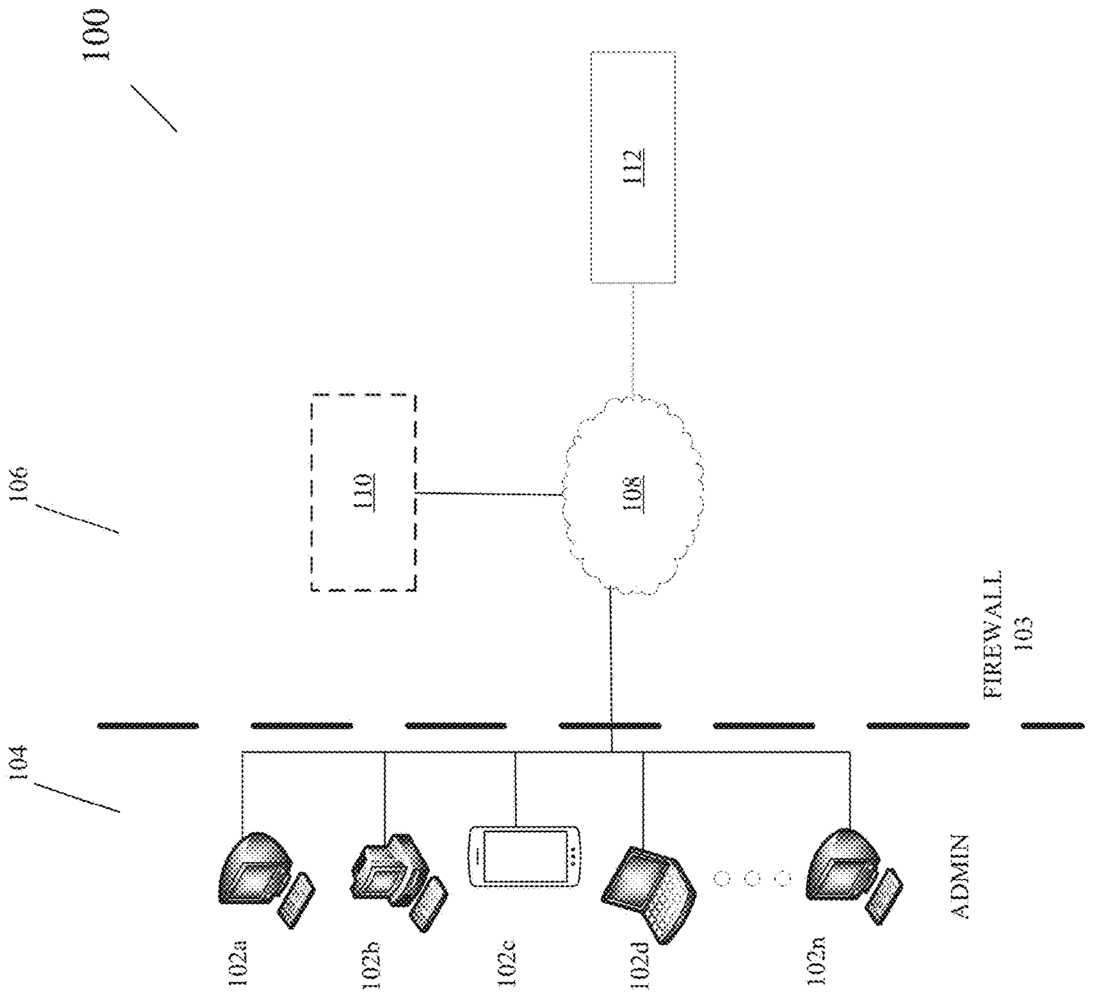
FIG. 1 is a schematic representation of an exemplary computer network on which the implementations of the systems and techniques disclosed herein may be deployed.

This document uses a variety of terminology to describe its inventive concepts. This terminology should be given its ordinary meaning and, unless otherwise indicated, may be understood as having meanings that are consistent with what follows.

For example, "generative artificial intelligence" (generative AI, or GEN AI) refers to artificial intelligence capable of generating text, images, videos, and/or other data using generative models, often in response to a prompt or other information entered by a human user at an endpoint device on a computer network. In a typical implementation, generative AI models learn the patterns and structure of their input training data and then generate new data that has similar characteristics. Some examples of generative AI tools include ChatGPT, GPT-4, Scribe, AlphaCode, GitHub Copilot, Bard, Synthesia, Amazon Q Developer, IBM Watson Code Assistant, CodeWP, and many others.

The phrase "sensitive information" refers to data stored or entered into a private computer network (e.g., on an end user device within an organization's security protected network), the disclosure of which outside of the private computer network may be harmful or lead to undesirable, unintended consequences personally, professionally, commercially, or otherwise. Examples of sensitive information include private, confidential, and/or proprietary information, such as social security numbers, salary information, trade secret information, customer lists and contact information, classified documents, and/or otherwise commercially valuable proprietary or confidential documents.

A "private network" is a computer network that is owned, operated, and controlled, and, absent a breach in security, exclusively accessible by a particular person or organization (e.g., company, business, church, etc.). A private network may be shielded from unauthorized access by a firewall (which may include any one or more of a variety of network security measures). A "firewall" is a network security system configured to monitor and control incoming and outgoing traffic on a computer network based on predetermined security rules to establish a barrier between a trusted network (e.g., a "private network") and an untrusted network.

A "chat interface" or "chat-style interface" is a computer-implemented user interface for a chat application. A typical chat interface may include, for example, a compose field, a submit button, message bubbles, etc. A "compose field" is a visual element in a chat interface that forms a field in which a human user can enter and edit text (e.g., a prompt for a remote generative AI tool) and/or other information before being sent or transmitted to a particular remote destination on a network (e.g., a remote generative AI server). A "submit button" is a visual element on a chat interface (or computer functionality), the selection (or clicking) of which initiates a process that may lead to any text or other information in the compose field to be transmitted to the particular remote destination on the network. More specifically, as described herein, selecting a submit button typically initiates a process that leads to the transmission of text or other information in the compose field to a remote (e.g., generative AI) server, as long as the endpoint device running the chat application first determines that the text and other information to be transmitted does not contain sensitive information.

The word "in-line" refers to acts that take place directly within a document in a computer application. If, for example, a particular computer application, for example, is configured to provide in-line access to generative artificial intelligence, then that application may present a human user with the ability to enter AI prompts into the document itself and/or automatically attempt to solicit feedback from the generative artificial intelligence based on context information from the document itself, without explicit instructions from a human user to make such an attempt.

An "AI prompt" or simply "prompt" refers to natural language text or instruction that can be interpreted and responded to by a generative AI tool and that describes a task that the generative AI tool should perform. A "prompt" may be initiated by a human user at an end point device or by a computer application running on the end point device, automatically, without explicit direction from a human user.

An "endpoint agent" is a virtual agent, and native application on a computer endpoint device, implemented, at least in part, by virtue of one or more computer processors executing computer readable instructions stored on a computer storage media that cause the one or more processors to perform computer-implemented functionalities disclosed herein as attributable to the endpoint agent or endpoint device. An endpoint agent may be deployed, for example, on an endpoint device of a computer network and, particularly, within an organization's private network that is connected via a firewall, or the like, to an external network that includes one or more servers hosting generative AI technologies.

A "scanning engine" is a virtual engine, implemented by one or more computer processors executing computer readable instructions stored on a computer storage media that cause the one or more processors to perform computer-implemented functionalities disclosed herein as attributable to the scanning engine. A scanning engine may be deployed, for example, on an endpoint device of a computer network and may, in some implementations, be incorporated into, or be deployed to operate in conjunction with, a corresponding endpoint agent. A "session" refers to a time-delimited, two-way connection between two or more communication devices or ends (e.g., a human user or the computer where the human user is logged in and a server) usually involving the exchange of packets between the devices or ends. A session is typically implemented as a layer in a network protocol. "Session information" refers to information about a particular session, such as usernames, computer identifiers, user activities performed during the session, network locations, timing, etc. Session information may be collected, for example, by a "session monitoring agent," which is a virtual agent, implemented by one or more computer processors executing computer readable instructions stored on a computer storage media that cause the one or more processors to collect and store in memory session information. A session monitoring agent may be deployed, for example, on an endpoint device of a network and may, in some implementations, be incorporated into a corresponding endpoint agent.

A "code editor" is a software tool that provides a comprehensive integrated development environment (IDE) that can be used to write, edit, debug, and build code. The resulting code may be deployed, for example, as a computer application (app) or portion thereof. One example of a code editor is the Visual Studio® computer code editor. Various embodiments of the Visual Studio® IDE include features to facilitate coding processes. These include AI-assisted development tools, such as the GitHub Copilot extension, that provide access to a remotely-located AI tool (e.g., via a chat interface and/or through in-line suggestions).

An "application programming interface" ("API") is a type of software interface that enables two or more computer programs and/or components to communicate with each other, enabling one, for example, to access functions of the other.

In a computer graphical user interface, for example, a component such as a window or document has "focus" when it is selected to receive input from the user by an event such as a mouse button click or keypress. Typically, the focus is withdrawn from an element by giving another element the focus.

A "web browser" is a computer application that may run on a computer endpoint device for accessing websites from the endpoint device. When a human user, for example, requests a web page from a particular website, for example, the web browser may retrieve its files from a web server and display the page on the human user's display screen. A "browser extension" is a software module for customizing a web browser.

A "handler" is a computer program to perform a particular function, such as control of input from, and/or output to a specific device. Web-based handlers allow web-based applications (e.g., web browsers) to perform functions associated with incoming and outgoing communications or requests and responses. A "custom handler" component of a web browser, for example, provides a way to register custom protocol handlers for specific URL schemes. Custom handlers may be used to translate a http request's URL so that it is redirected to a different service or different http(s) site, for example. A number of handlers may be involved in a web browser attempting to fetch internet resources (e.g., from a generative AI tool of a remote generative AI service). In a typical implementation, the web browser calls all involved handlers and, in some implementations, the fetch function is performed if, and only if, all handlers return the call affirmatively. Typically, if one of the involved handlers fails to return the call affirmatively, the fetch function is not executed. A "fetch" application programming interface (API) is a Javascript API for retrieving internet resources.

"Native messaging" enables an extension to exchange messages with a native application on a computer endpoint device (e.g., a user's computer). The native messaging typically serves the extensions without additional accesses over the web. In the Goggle Chrome® web browser, for example, extensions can exchange messages with a native application (e.g., one of the endpoint agents disclosed herein and installed on an endpoint computer) using an API that is similar to the other message passing APIs. Native applications that support this feature generally register a native messaging host that can communicate with the extension. A "native application" is a software program that may be designed to run on a particular operating system, for example.

"Post" refers to a request method supported by hypertext transfer protocol (HTTP) for use on the Internet. A post request method requests that a web server accepts the data enclosed in the body of the request message (e.g., a payload) for storage and/or processing.

Technical Disclosure

As mentioned above, generative artificial intelligence (generative AI, or GEN AI) refers to artificial intelligence capable of generating text, images, videos, and/or other data using generative models, often in response to a prompt entered by a human user at an endpoint device on a computer network. In a typical implementation, generative AI models learn the patterns and structure of their input training data and then generate new data that has similar characteristics. Some examples of generative AI tools include ChatGPT, GPT-4, Scribe, AlphaCode, GitHub Copilot, Bard, Synthesia, Amazon Q Developer, IBM Watson Code Assistant, CodeWP, and many others.

Generative AI tools may be accessed from an endpoint device on a computer network in a variety of ways. In some instances, a human user at the endpoint device may access generative AI functionalities through a chat-style interface on the endpoint device that interacts with a remote server hosting the generative AI tool. In some instances, a computer application may be configured to provide generative AI suggestions in-line within a document the human user is working on at the endpoint device. In those instances, the endpoint device may be configured, for example, to access a remote server hosting a generative AI tool periodically to solicit AI generative suggestions from the generative AI tool. In still other instances, the endpoint device may be configured, for example, to enable the human user to access generative AI functionalities through a web browser on the endpoint device configured to access a remote server hosting a generative AI tool.

In each of these instances, various types of information may be transmitted from the endpoint device to the remote server hosting the generative AI tool to enable the generative AI tool to generate a helpful response. Often, the remote server that hosts the generative AI tool is located beyond any firewall, or other protective security measures, that shield the private network, to which that the computer endpoint device belongs, from unauthorized access. If any of the information transmitted to the remote server to solicit the desired feedback from the generative AI is sensitive information, there is an enhanced risk that transmitting that information will compromise confidentiality of the sensitive information and the sensitive information may end up in the wrong hands and used to the detriment of the organization that operates the private network, to which the user's endpoint device belongs.

There is an interest in preventing or at least minimizing such risk, therefore, in preventing the transmittal of any information that may contain such sensitive information. However, there is also an interest in providing access to the extraordinarily helpful generative AI functionalities to the largest extent practical, without unduly jeopardizing the confidentiality of sensitive information. In a typical implementation, the systems and techniques disclosed herein, strike a balance between those competing interests, and simultaneously ensure robust access to generative AI functionalities, while minimizing the risk of disclosing confidential sensitive information. More specifically, in various implementations, the systems and techniques disclosed herein respectively strike this advantageous balance in connection with chat-style interfaces to generative AI tools, applications that provide for in-line generative AI functionalities, and/or web browsers that facilitate access to generative AI functionalities.

FIG. 1 is a schematic representation of an exemplary computer system 100, on which implementations of the systems and techniques disclosed herein may be deployed. The illustrated computer system 100 includes a firewall 102 (which may include any number of a variety of different network security measure) that demarcates an organization's private network 104 from an external network 106 outside of the firewall 102. The organization's private network includes multiple user endpoint devices 102*a* . . . 102*n*, each of which is a networked workstation with a desktop or laptop computer, a smart device, or other network-connected computer device that enables a user to access computer functionalities. Endpoint devices 102*a*-102*d*, in the illustrated example, are intended for use by human users that may be utilizing or seeking to utilize generative AI functionalities in the work they do on their endpoint devices 102*a*-102*d*. Endpoint device 102*n*, in the illustrated example, is a network administrator (for the organization who owns the internal network 104). The network administrator is typically able to access generative AI functionalities on endpoint device 102*n* and is generally similarly restricted in such access where concerns over leakage of sensitive information may be warranted. However, typically, the network administrator is further tasked with monitoring system operations policies and the network administrator may be configured to receive notifications (e.g., of a blocked attempt to access the generative AI server 112).

The firewall 102, in a typical implementation, is a network security system configured to monitor and control incoming and outgoing traffic based on predetermined security rules to establish a barrier between a trusted network (e.g., the organization's private network 104) and an untrusted network (e.g., the external network 106). Of course, the representation in FIG. 1 of the private (or internal) network 104 is partial and schematic only. In practice, the private network 104 (as well as the external network) would include other components not explicitly illustrated in the schematic representation of FIG. 1.

The external network 106 in the illustrated implementation includes a communication network (e.g., the Internet) 108 that connects and facilitates communication between the organization's internal network 104 and a remote security monitoring server 110 and a generative AI server 112. The remote security monitoring server 110, in various implementations, is configured to interact with an endpoint agent deployed on each respective one of the endpoint devices 102*a* . . . 102*n* to provide any one or more (or all) of the security monitoring functionalities as disclosed, for example, in issued U.S. Pat. No. 11,449,603, entitled Managing Data Exfiltration Risk, U.S. Pat. No. 11,388,250, entitled Reduction of Data Transmission Based on End-User Content, U.S. Pat. No. 11,775,670, entitled System and Method for Light Data File Duplication Prevention, each of which is owned by Proofpoint, Inc., the applicant of the current application, and each of which is incorporated herein in its entirety.

The generative AI server 112 in the external network 106 is configured to interact with each respective one of the endpoint devices 102*a* . . . 102*g* to make available generative AI functionalities at the endpoint devices 102*a* . . . 102*g*. In various implementations, the generative AI server 112 may be configured to interact with the endpoint devices 102*a* . . . 102*n* in any one or more of a variety of manners. For example, in some implementations, the generative AI server 112 may be configured to interact with the endpoint devices 102*a* . . . 102*n* through a chat-style interface at the endpoint devices 102*a* . . . 102*n*. In some implementations, the generative AI server 112 may be configured to interact with the endpoint devices 102*a* . . . 102*n* in a manner that facilitates providing generative AI suggestions directly in-line within a document (e.g., a computer coding program) that a human user is working on at the endpoint device 102*a* . . . 102*n*. In still other implementations, the generative AI server 112 may be configured to interact with the endpoint devices 102*a* . . . 102*n* through web browsers on the endpoint devices 102_a_ . . . 102_n_. In some implementations, the generative AI server 112 may be configured to interact with the endpoint devices in more than one (or all) of these manners. In any event, as disclosed herein, the system 100 is configured to block or interrupt such interactions where sensitive information may be included in information that would be or would need to be transmitted from an endpoint device 102_a_ . . . 102_n_ to the AI server 112 in order to the AI server 112 to provide the AI functionalities it is configured to provide.

Figure 2:
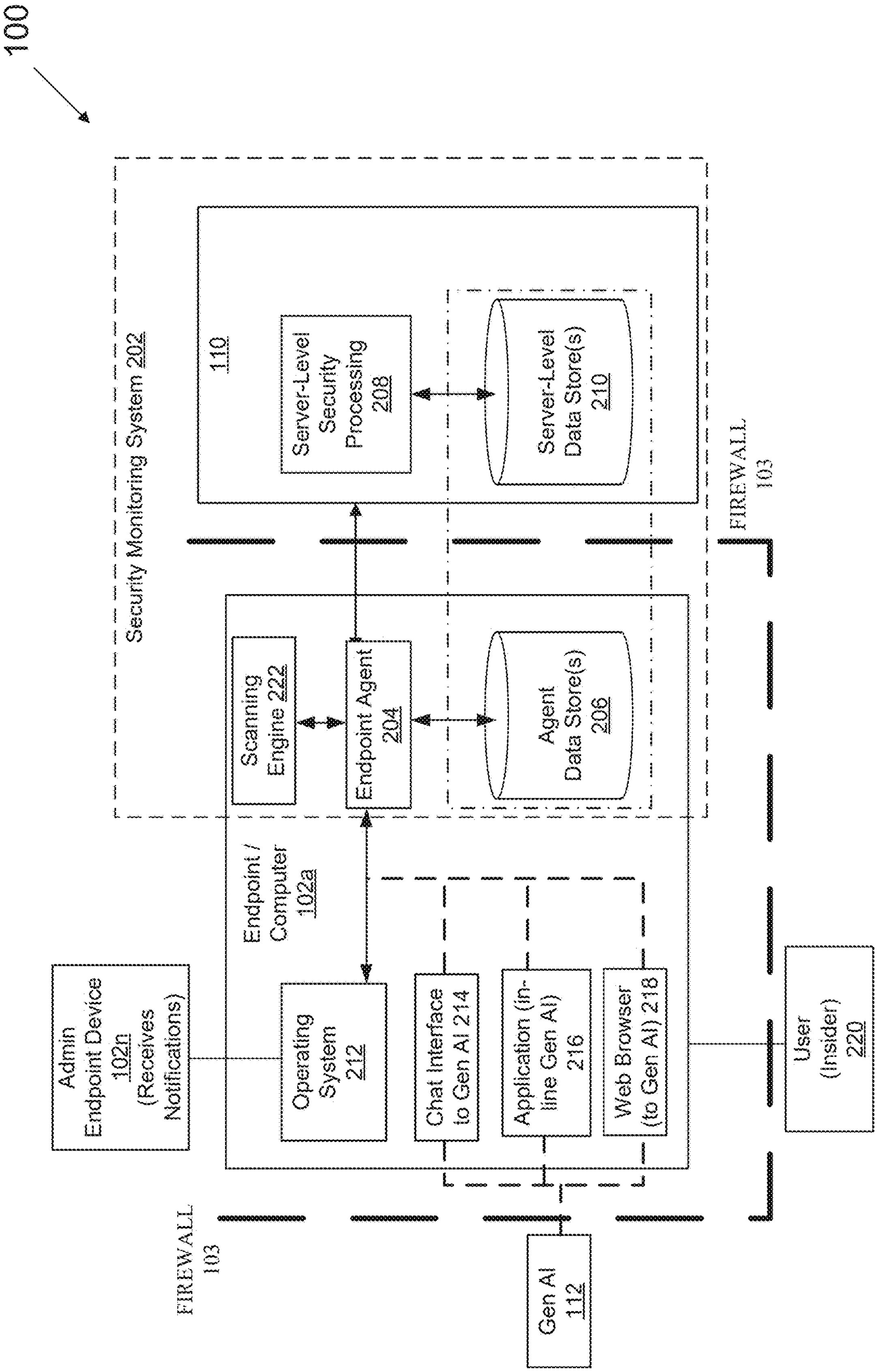
FIG. 2 is a partial, more detailed schematic view of the computer network of FIG. 1.

FIG. 2 is a more detailed schematic representation showing a portion of the system 100 in FIG. 1. The illustrated implementation shows a security monitoring system 202 deployed across the endpoint device 102_a_ (a desktop computer) and the security monitoring server 110. The security monitoring system 202 according to the illustrated implementation includes an endpoint agent 204, a scanning engine 222, and an agent data store(s) 206 on the endpoint device 102_a_, and a server-level security processor 208 and a server level data store(s) 210 on the security monitoring server 110. The scanning engine 222 in the illustrated implementation is shown as a separate component from the endpoint agent 204. In some implementations, however, the scanning engine 222 (and its associated functionalities) may be incorporated into and form a part of the endpoint agent 204.

In various implementations, the components of the illustrated security monitoring system 202 may interact with one another in the manner(s) set forth in the aforementioned US patents and patent application publications to provide one or more of a variety of possible security-related functionalities at, or in association with, the illustrated endpoint device 102_a_. In various implementations, the associated functionalities may be performed by the components on the endpoint device 102_a_, by the components at the security monitoring server 110, and/or distributed therebetween.

The endpoint device 102_a_ has an operating system 212, a computer processor and computer memory storing computer readable instructions that when executed by the computer processor, cause the endpoint device 102_a_ to provide a chat interface to the generative AI server 112, to provide in-line access to generative AI functionalities provided by the generative AI server 112 within an application on the endpoint device 102_a_, and/or to provide access via a web browser to the generative AI server 112. Moreover, in various implementations, the computer memory stores further instructions that, when executed by the computer processor, cause the endpoint device 102_a_ to respond to and handle potential interactions between the endpoint device 102_a_ and the AI server 112 in a manner that balances the sometimes conflicting interests between facilitating access to generative AI functionalities at the generative AI server 112 and protecting against potentially harmful disclosure of sensitive information by transmitting such information to the generative AI server 112. The specific manner in which the endpoint device 102_a_ responds to any such potential interactions depends on the manner in which such interactions are initiated (e.g., through a chat-style interface 214, in-line within an application 216 (e.g., a computer coding program) directly, or through a web browser 218) and whether such interactions may require the transmission of sensitive information from the endpoint device to the generative AI server 112, which, as shown in FIG. 2, is beyond the protections provided by the organization's firewall 102.

The illustrated figure shows a human user (e.g., an insider at the organization) at, and interacting with, the endpoint device 102_a_. In various implementations, the human user would be a person that intends to and attempts to access the generative AI server 112 through one or more means. The illustrated figure also shows the administrator's endpoint device 102_n_, which is configured to receive notifications (e.g., via the organization's internal network 104) if, for example, an information transmission is blocked by the endpoint device 102_a_ due to sensitive information having been included in a potential transmission of date to the external generative AI server 112. In a typical implementation, the system 100 may be configured to provide a notification or message to the user (e.g., at endpoint device 102_a_) that a particular attempt to access the AI functionalities at the generative AI server 112 were thwarted.

Generative AI Chat Interface

A generative AI chat interface (e.g., 214 in FIG. 2) refers to a chat-style interface that may appear on a graphical user interface on an endpoint computer (e.g., 102_a_) by virtue of a computer program executing on that endpoint computer 102_a_. The chat-style interface enables the end user to send prompts from the end point computer 102_a_ to a remote generative AI tool (e.g., 112) and to receive feedback from the generative AI tool 112 at the endpoint computer 102 in response to each prompt. Prompts and feedback can be or include, for example, text, code, imagery, etc. Generative AI chatbots can generate creative text formats like code, letters, email, etc. They can also simulate human conversation by responding to user prompts in a seemingly natural, human-like way. The Visual Studio® Code application is one example of a computer application that may include a generative AI chat interface. The Visual Studio® Code application is a computer code editor for building and debugging computer applications. The Visual Studio® Code application may be provided with a generative AI chat functionality, such as an integrated GitHub Copilot® chat feature. The GitHub Copilot® chat feature includes a chat-style interface, and acts as an AI-powered coding assistant that helps users write code faster and with less effort.

Figure 3:
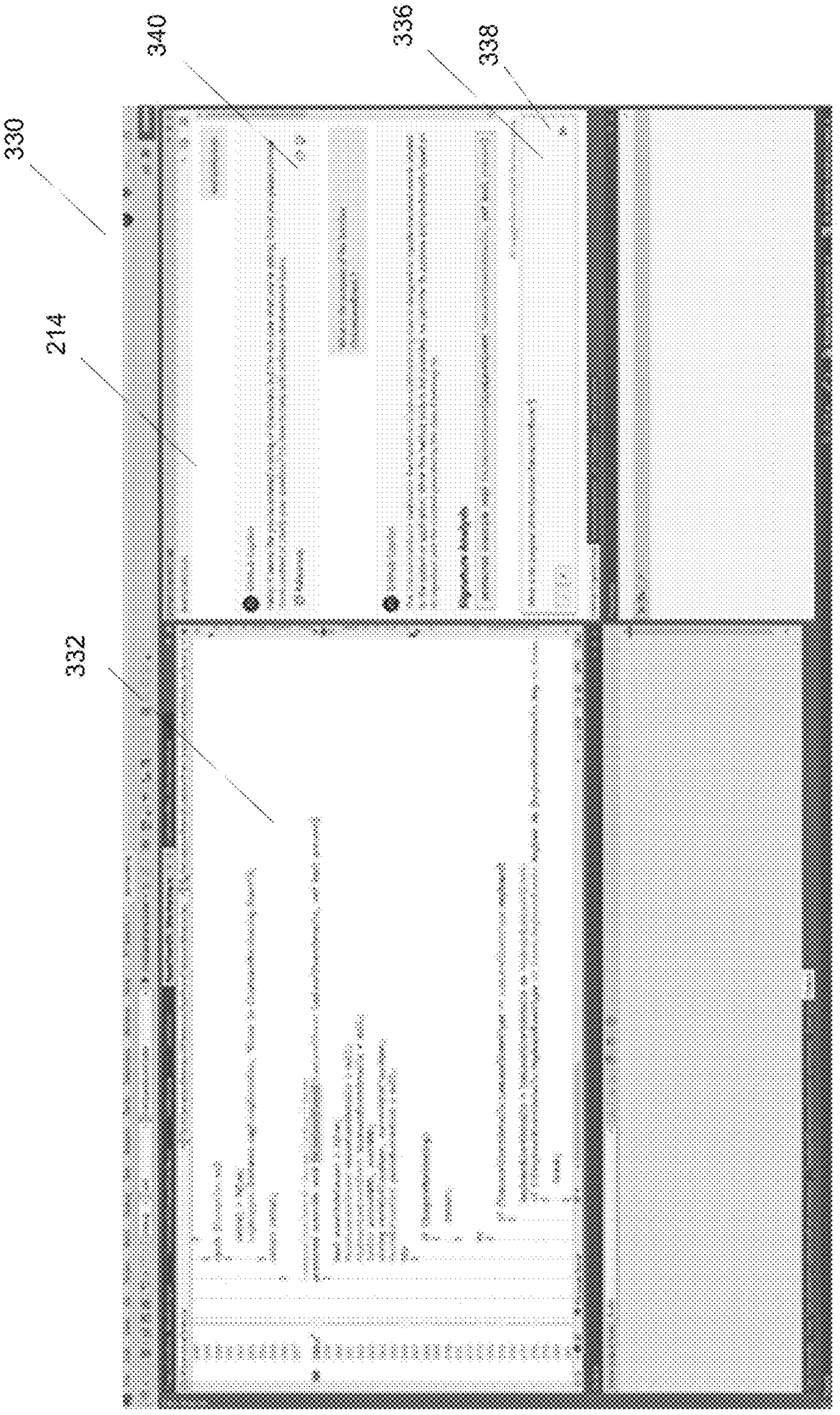
FIG. 3 is an exemplary screenshot from an endpoint device in the computer network of FIG. 1.

FIG. 3 is an example of a screenshot showing an exemplary user interface 330 that may appear on one of the endpoint devices (e.g., 102_a_) in the computer system 100 of FIG. 1. The user interface 330 represented in the figure is running the Visual Studio® Code application with an integrated GitHub Copilot® chat feature. Blurred text is shown in the illustrated screenshot. This is intended to indicate that, in the illustrated screenshot, text can be present in those locations, but the specifics of the blurred text are not important to the discussion that follows.

The illustrated screenshot has a coding field 332 that enables a human user (e.g., at a human-machine interface) to enter and/or edit computer executable code for a web, desktop, or mobile application under development. The coding field 332 in the illustrated example is populated with blurred text that represents an exemplary collection of such computer executable code. The illustrated screenshot also has a chat-style interface 214 that enables the human user to enter prompts (e.g., textual queries for a generative AI tool located at a remote network destination, such as the generative AI server 112 in FIG. 1) and to receive generative AI feedback from the generative AI tool in response to the prompts. The chat-style interface 214 in the illustrated implementation has a chat composing field 336 that enables a human user to enter and edit text (e.g., prompts for the remote generative AI tool) and/or other information before being sent or transmitted to the remote network destination (e.g., the remote generative AI server 112). The chat composing field 336 in the illustrated implementation displays a prompt generated by the generative AI tool. Blurred text appears in the chat field 336 and represents either AI prompts (or portions thereof) as well as responses to AI prompts received from the generative AI tool. The chat interface 214 in the illustrated implementation has a submit button 338, associated with the chat composing field 336, which has the visual appearance of a right-pointing arrow in the illustrated example. The selection (or clicking) of submit button 338, by the human user, initiates a process that, as discussed below, may lead to any text or other information in the chat composing field 336 to be transmitted to the remote destination on the network (i.e., the remote generative AI server 112). More specifically, in an exemplary implementation, and as described in further detail herein, selecting the submit button 338 initiates a process that may lead to the transmission of text or other information in the chat composing field 336 to the remote generative AI server 112, as long as the endpoint device (e.g., 102*a*) first determines that the text and other information does not contain any sensitive information. The chat interface 214 also has a dialogue box 340 that includes text bubbles with previously transmitted text excerpts (e.g., AI prompts) submitted by the human user from the chat composing field 336, and previous responses to each of the previously transmitted text excerpts (AI prompts). The text excerpts (e.g., AI prompts) and previous responses in the dialogue box 340 are shown as blurred text to indicate the presence of text without affording any particular importance to the particular text shown.

Operationally, a human user interacting with the illustrated screenshot may enter computer code into the coding field 332. If, at some point, the human user has a question about the code being created, or how to code a particular functionality, or anything else that a generative AI coding tool may be able to assist with, the human user may enter an AI prompt into the compose field 336, hit the submit button 338 and, as long as the information sent with the AI prompt to the remote AI tool does not include sensitive information, receive a response to the AI prompt, on screen, within the dialogue box 340. The human user may then use the response to the AI prompt to continue developing the code on coding field 332. If the endpoint device, on the other hand, determines that sensitive information would be present in the AI prompt transmitted to the remote AI tool, the transmission is blocked and the human user (as well as, optionally, a system admin) is notified that the transmission is blocked.

Figure 4:
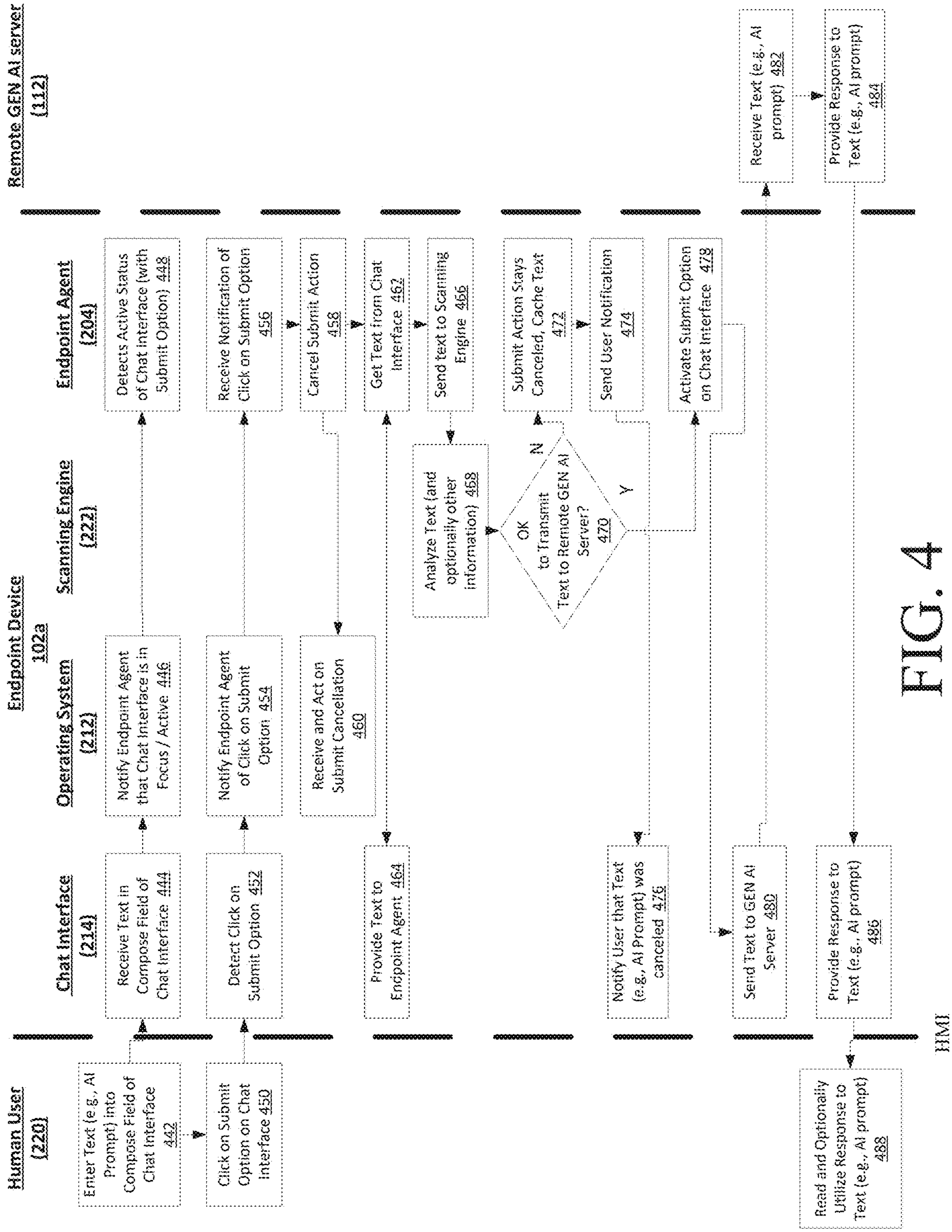
FIG. 4 is a flowchart representing an implementation of a process that may be performed on and with the exemplary computer network of FIG. 1.

The foregoing processes may be implemented in a variety of different ways. FIG. 4 is a flowchart representing an exemplary implementation of just such a process. The process includes steps performed by a human user 220, steps performed by an endpoint device 102*a* on a computer network 100, and steps performed by a remote (relative to the endpoint device 102*a*) generative AI server 112. Each of the steps performed by the endpoint device 102*a* in the illustrated implementation is performed by either the chat interface 214, the operating system 212, the scanning engine 222, or the endpoint agent 204. The steps performed by the human user 220 are performed through interactions involving one or more human-machine interfaces (e.g., keyboard, mouse, display screen, etc.) coupled to the endpoint device 102*a*. A firewall 103 is between the endpoint device 102*a* and the remote AI server 112, which hosts a generative AI agent/tool.

The process represented in the illustrated implementation begins (at 442) with the human user 220 entering text (e.g., an AI prompt) into a compose field 336 of a chat interface 214. In a typical implementation, the text entered may be an AI prompt, intended to be sent for a remote generative AI tool residing on a remote generative AI server 112. As shown in the illustrated flowchart, the chat interface device 214 (at 444) receives the text being entered in the compose field 336 of the chat interface 214. The operating system recognizes that the chat interface 214 is active/in focus and notifies the endpoint agent 204 of that change in status (at 446). The endpoint agent 204 receives the status notification from the operating system 212 (at 448). In some implementations (e.g., ones involving the Visual Studios® Code environment), WindowEventsClass.WindowActivated Event: occurs when a window receives focus, which can be used to notify the endpoint agent 204 of such. (See, e.g., learn.microsoft.com/en-us/dotnet/api/envdte.windoweventsclass.windowactivated?view-visualstudiosdk-2019 from the Visual Studio IDE website).

At 450, the human user selects (or clicks on) the submit button 338 on the chat interface 214. The chat interface 214 (at 452) receives the submit button selection and, in response, the operating system 212 (at 454) notifies the endpoint agent 204 of the submit button selection. The endpoint agent 204 (at 456) receives the notification of the submit button selection from the operating system 212. In response to receiving the notification of the submit button selection (at 456), the endpoint agent 204 requests cancellation of the submit action in order to assess the AI prompt for any sensitive information prior to allowing the AI prompt to be transmitted out of the endpoint device 102*a* and beyond the firewall 103 (e.g., to the remote generative AI server 112). In response to the endpoint agent's cancellation, the operating system 212 (at 460) receives and acts on the cancellation request and cancels the submit action.

In an exemplary implementation, the SetWindowsHookExA function in the Microsoft® Visual Studios® Code environment may be used in this regard. In a typical implementation, the SetWindowsHookExA function may be used to install an application-defined hook procedure into a hook chain. The hook procedure may be installed to monitor the system for certain types of events (e.g., a click within the chat interface 214). (See, e.g., the Microsoft® Visual Studio® IDE website at learn.microsoft.com/en-us/windows/win32/api/winuser/nf-winuser-setwindowshookexa). The trigger for detection of click inside GitHub Copilot® chat is a keyboard/mouse operation. Once the endpoint agent 204 (e.g., at 456) identifies that the submit button click occurred inside GitHub Copilot® chat, the endpoint agent 204 will be able to (and does, at least temporarily) prevent the operation if necessary according to sensitivity of the data. In some implementations, the endpoint agent 204 identifies the GitHub Copilot® chat submit button selection using FlaUI. FlaUI is a .NET library which helps with automated UI testing of Windows applications (Win32, WinForms, WPF, Store Apps, etc.).

Next (at 462), the endpoint agent 204 gets the text from the chat interface 214. At 464, the text from the chat interface 214 is provided to the endpoint agent 204. In an exemplary implementation, the endpoint agent 204 is able to get the actual text (e.g., code) from the chat interface 214 using the TextDocument Interface application program interface (API) in the Visual Studio® Code application environment. (See. e.g., the MicroSoft® Visual Studio® IDE website at learn.microsoft.com/en-us/dotnet/api/envdte.textdocument?view=visualstudiosdk-2022).

Next (at 466), the endpoint agent 204 sends the text to the scanning engine 222. At the scanning engine 222 (at 468), the text is analyzed for sensitive information. In some implementations, the text is analyzed in this regard on its own (i.e., without consideration to other information). In other implementations, the text is analyzed together with other contextual information, such as user session information, etc., collected by the scanning engine 222 that relates to the text and its potential for containing sensitive information. The specific manner in which the scanning engine 222 conducts its analysis can vary considerably. For example, in a relatively simple implementation, the scanning engine 222 may simply scan the text for any one or more of a variety of key words, character sequences, and/or phrases (saved in computer memory) that, if present within the text, would cause the scanning engine 222 to flag the text as sensitive. In various implementations, the agent data store(s) 206 of the security monitoring system 202, for example, may be prepopulated with a set of key words, character sequences, and/or phrases for the scanning engine 222 to search for in text that it receives from the chat interface 214. In various implementations, the system admin, for example, may be able to edit the prepopulated set and/or create a new set of customized key words, character sequences, and/or phrases for the scanning engine 222 to search for in the text it scans. Some examples of key words, character sequences, and/or phrases stored in the agent data store(s) 206, for example, include words like "confidential," "secret," "private," character sequences such as "SSN," which customarily stands for social security number, "DOB," which customarily stands for date of birth, and phrases such as "customer contact," "home address," etc. In some implementations, the scan may search for people's names, company names, and/or data structures (e.g., nine digit number, which may be social security numbers). In some implementations, the scanning engine 222 performs more complex and/or sophisticated scanning processes that may take into consideration other sources of information (e.g., user session information collected by session monitoring agents on the endpoint device 102*a*, for example). In some such implementations, the scanning engine may consider, for example, a role of the user within the organization, and/or the location of the endpoint device, as well as the content in the text to determine whether the text contains sensitive information, the transmission of which to a remote network destination should be restricted. In some implementations, the rules for scanning/analyzing may be stored, for example, as a policy in computer memory. The policy may be populated with default rules, user-provided rules, or a combination thereof.

Depending on the outcome of the scan (e.g., whether the scanning engine 222 identifies any sensitive information in the text from the chat interface 214), the scanning engine 222 (at 470) determines whether it is ok (i.e., acceptable) to transmit the text (e.g., a generative AI prompt) to the remote generative AI server 112. In a typical implementation, if the scanning engine 222 identified any sensitive information in the text from the chat interface, the determination (at 470) would be a negative one: that it is not ok to transmit the text to the remote generative AI server 112. However, in such implementations, if the scanning engine 222 did not identify any sensitive information in the text from the chat interface, the determination (470) would be a positive one, that it is ok to transmit the text to the remote generative AI server 112.

If (at 470), the scanning engine 222 determines that it is not ok to transmit the text to the remote generative AI server 112, according to the illustrated implementation, then endpoint agent 204 (at 472) allows the submit function that previously was canceled to stay canceled. In such instances, the endpoint agent 204 may store the scanned text from the chat interface 214 in cache for future reference and/or retrieval, if needed. In some implementations, the endpoint agent sends information about the blocked text to the remote security monitoring server 110 for tracking purposes. The endpoint agent 204, according to the illustrated implementation, also sends the human user a notification (at 474) that the generative AI prompt the user attempted to submit was blocked. In some instances, the notification will indicate that the reason for blockage was the presence of potentially sensitive information in the prompt. In the illustrated implementation, the chat interface 214 (at 476) presents the notification to the human user. Of course, there are numerous other ways that the notification could be presented to the human user at the endpoint device 102*a*.

If, on the other hand, the scanning engine 222 (at 470) determines that it is ok to transmit the text to the remote generative AI server 112, then the endpoint agent 204 (at 478) activates the submit button 338 (i.e., the submit functionality) on the chat interface 214. In response, the chat interface 214 (at 480) send the text to the remote generative AI server 112. This time, however, the endpoint agent 204 allows the already scanned text to pass to the remote generative AI server 112 without further scrutiny from a sensitivity perspective. The transmitted text reaches the remote generative AI server 112 (at 482), processes the prompt represented by the text, and provides a response (at 484). The response is sent back to the endpoint device 102*a* and is displayed on the chat interface 214 (at 486) and, thereby, presented to the human user 220 to read and optionally (at the human user's discretion), to utilize the response in crafting code in the coding field 332 (at 488).

Thus, it can be seen that, in a typical implementation, the systems and techniques disclosed herein enable human users to access generative AI tools that offer advantages in improving code and/or documents very easily and conveniently, while effectively minimizing the risk that sensitive data may be sent out from the endpoint device when soliciting the AI input. In a typical implementation, the systems and techniques disclosed herein control and make sure sensitive data does not leave the local environment. Essentially, the endpoint agent is provided with the capability of monitoring chat control (e.g., over any desktop app), intercept a submit action, scan the data to be sent, apply it against policy and text content it gets from the chat control, and either allow it to continue if not sensitive, or block it and notify the user if it is sensitive.

In-Line Access to Generative AI Functionalities

Certain computer applications include an AI-powered functionality that automatically offers in-line suggestions to users to improve or further develop a document the user is working on directly within the application and directly within the document. Such functionalities may provide, for example, AI-generated suggestions and/or commentary to facilitate completing snippets of computer code, writing WORD documents, improving grammar, etc. The GitHub Copilot® application, for example, serves as an AI-powered pair programmer that is able to automatically offer suggestions to complete code, comments, testing, etc. The GitHub Copilot® application is generally able to provide these sorts of suggestions directly in the editor, for example, while the user is writing code. Moreover, it is generally adaptable to work with a broad range of programming languages and frameworks. More specifically, in a typical implementation, the GitHub Copilot® application provides AI-based in-line suggestions as the user types, sometimes attempting to complete a line of code being written and sometimes attempting to complete or provide a whole new block of code. The user, typically, is given the option to accept all of, a part of, or none of any AI-based in-line suggestions provided. In-line suggestions, such as offering an implementation of some particular JavaScript function, may be presented to the user, on the user interface of the GitHub Copilot® application, in a manner that visually distinguishes the suggestion being made from other sections code (e.g., code that the user already has created or accepted). For example, in some implementations, the GitHub Copilot® application offers suggestions by using dimmed text (relative to other code text that appears on the user interface).

Such systems typically operate on endpoint devices (e.g., 102*a* in FIG. 1) but often tap into remotely-located AI tools (e.g., AI tools residing on remote servers, such as server 112 in FIG. 1) to retrieve the AI-powered suggestions they provide to users. In order to secure such suggestions, the endpoint devices (e.g., 102*a*) typically transmit information from the document being worked on at the endpoint device (e.g., 102*a*) to the AI tool at the remote network destination (e.g., remote server 112), beyond the organization's security system and/or firewall 103, for example. This, of course, exposes the information transmitted to privacy and security vulnerabilities.

Figure 6:
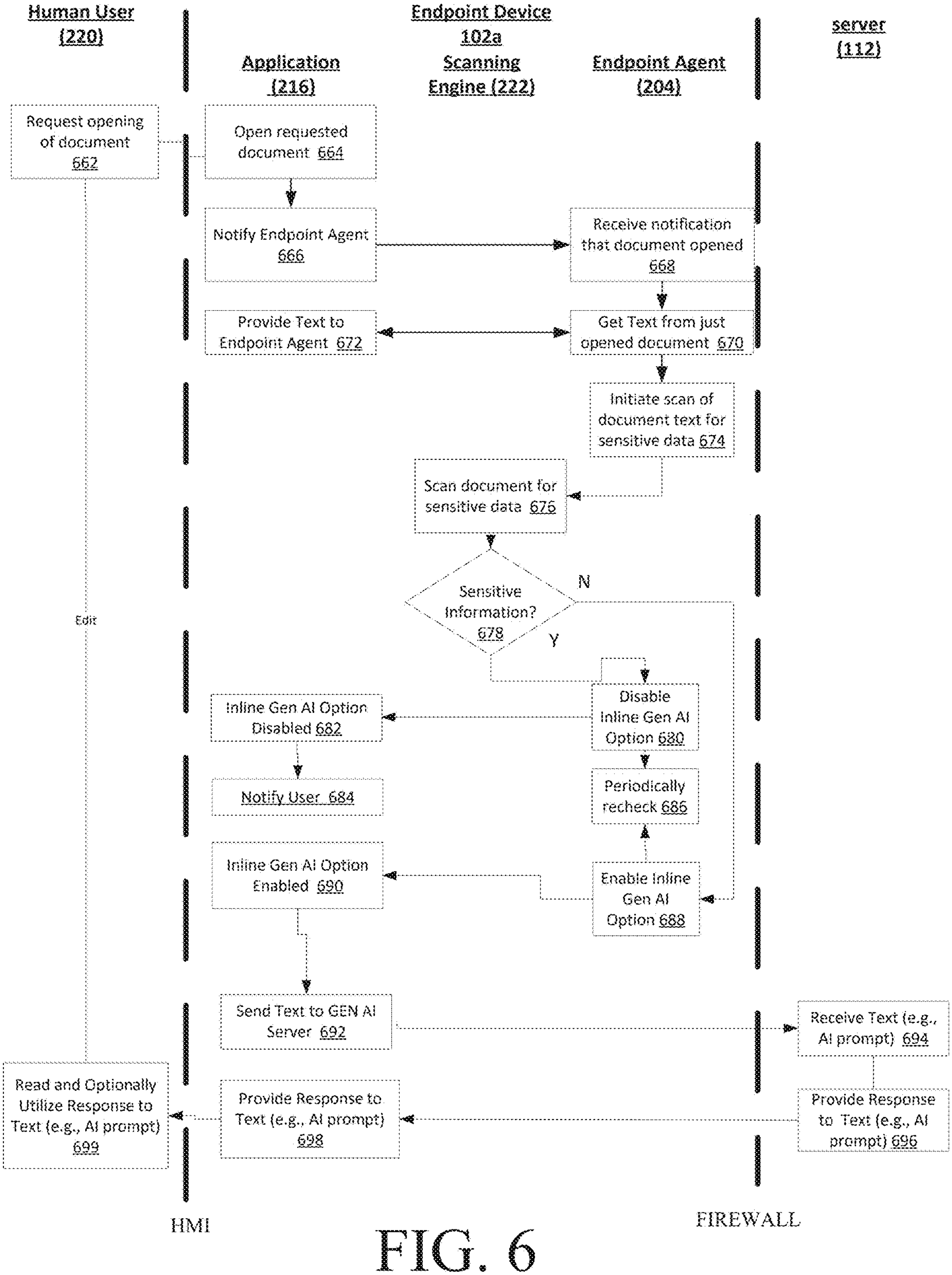
FIG. 6 is a flowchart representing an implementation of another process that may be performed in and with the exemplary computer network of FIG. 1.

FIG. 6 is a flowchart representing a process that implementations of the system 100 in FIGS. 1 and 2 may perform to help mitigate these sorts of risks.

According to the illustrated flowchart, the human user 220 interacts with an application 216 on the endpoint device 102*a* (at 662) to request that a document be opened by and within the application 216 on the endpoint device 102*a*. The interactions in this regard occur, according to the illustrated implementation, by the user interacting with the application 216 through one or more human-machine interfaces (HMI), such as keyboard, mouse, touchpad, etc.

The document to be opened can be any one of a variety of different types of documents including, for example, a document that contains or is for containing source code, a word processing document, etc. The application 216 is whatever application corresponds to the document. For example, if the document is a source code document, then the application 216 might be a computer code editor, such as the Visual Studio® code editor, with an integrated GitHub Copilot® application configured to provide AI-generated suggestions directly into an open computer code document. If the document is a word processing document, for example, then the application 216 might be a word processing program with an integrated functionality configured to provide AI-generated suggestions automatically and directly into an open word processing document (e.g., without requiring the user to proactively solicit input from an AI tool through a separate chat interface, web browser, or any other means outside of the document being created). In such instances, the AI-generated suggestions are provided on screen, typically in the field on the document where the code or other document content is being created, automatically as the user types or creates new content. To be clear, these automatically generated AI-powered suggestions are made without requiring the human user to interact with or engage any separate interface, such as a chat interface, a web browser, or any other interface outside the field of the document where the content of the document at issue is being created.

The application 216, in response to receiving the request (at 662), opens the requested document (at 664). The opened document typically appears onscreen, in a window provided by the application. In a typical implementation, upon opening the document, focus initially resides at the application window that contains the just opened document. In a typical implementation, focus returns to a window when a user, for example, clicks into the window. WindowEventsClass. WindowActivated Event: occurs when a window receives the focus. (See, e.g., the Microsoft Visual Studio IDE website at learn.microsoft.com/en-us/dotnet/api/envdte.windoweventsclass.windowactivated?view=visualstudiosdk-2019). In this manner, the endpoint agent, for example, may be notified when a window gains focus.

In a typical implementation, the application is configured such that when its in-line AI-generated suggestions functionality is enabled, any AI-generated suggestions are generally obtained by the application, for example, automatically (i.e., without a specific request from the human user) and periodically by transmitting some portion (or all) of the document's content (e.g., the substantive computer code being created if the application is a computer code editor, or the substantive written text being created if the application is a word processing application) to a remote generative AI tool (e.g., residing at the remote generative AI server 112, beyond the organization's firewall 103) for processing and by receiving a response from the remote generative AI tool for presenting on screen to the human user 220. In some implementations, when a document is initially opened, its in-line AI-generated suggestions functionality may be initially disabled.

The application 216, according to the illustrated implementation, notifies the endpoint agent 204 (at 666) that the requested document has been opened. The endpoint agent 204 (at 668) receives the notification and the (at 670) gets the text (i.e., the content of the document) from the just opened document. According to the illustrated implementation, the text from the document is provided from the application to the endpoint agent 204 at 672. In an exemplary implementation involving a Visual Studio® environment, the endpoint agent 670 is able to get the actual code via the TextDocument Interface. TextDocument Interface represents a text file open in the editor. (See, e.g., the Visual Studio IDE website at learn.microsoft.com/en-us/dotnet/api/envdte.textdocument?view=visualstudiosdk-2022).

The endpoint agent 204 then initiates a scan of the text for sensitive information (at 674). The scanning engine 222 (at 676) scans/analyzes the text of the document for sensitive information. The text from the document can be scanned (at 676) in any number of a variety of ways. Some of these ways were discussed above in reference with the discussion of step 468.

Depending on the outcome of the scan, the scanning engine 222 (at 678) determines whether the content of the just opened document contains any sensitive information and, thus, whether it is ok (i.e., acceptable) to transmit the text to the generative AI tool at the remote generative AI server 112. If the scanning engine 222 (at 678) determines that sensitive information is present in the content of the just opened document, then the endpoint device 102*a* does not transmit any of the content to the remote generative AI server 112. In that case, the endpoint agent 204 disables the in-line generative AI functionality (at 680) at the application (682). In an exemplary implementation (e.g., in a Visual Studio® environment), the endpoint agent 204 may identify when a new code is opened and in case sensitive information is identified, then IN-LINE GITHUB will be disabled by the following API: CommandBarControl.Enabled Property. CommandBarControl.Enabled Property determines whether the control is enabled. (See, e.g., the Microsoft Visual Studio IDE website at learn.microsoft.com/en-us/dotnet/api/microsoft.visualstudio.commandbars.commandbarcontrol.enabled?view=visualstudiosdk-2022#microsoft-visualstudio-commandbars-commandbarcontrol-enabled).

The application 216 then notifies the user (at 684) (e.g., with an onscreen message) that the in-line AI assistant functionality has been disabled and/or is not available. The user is then able to work within the document to edit, add, or delete content, save the document at any point, close the document, etc., just not with any assistance from the remote generative AI tool on the remote generative AI server 112, unless the status of the document subsequently changes (e.g., from containing sensitive information to not containing sensitive information). In this regard, the endpoint agent 204 is configured to periodically recheck the document content for sensitive information (at 686). Each recheck (at 686) may involve following a process like the one that starts at 670 and 672 in the illustrated flowchart. A change in document status (e.g., from containing sensitive information to not containing sensitive information) may be warranted in subsequent rechecks (at 686) due to the human user, for example, editing the document to remove any sensitive information. At that point, the endpoint device 102*a* reenables the in-line generative AI functionality (at 688).

If the endpoint agent 204 (at 678) determines that the just opened document does not include sensitive information, then the endpoint agent enables the in-line generative AI option (at 688) at the application (at 690). At that point, the application 216 is free to (and does) transmit its content to the trained generative AI tool at the remote generative AI server 112 (at 692) for processing. The remote generative AI server 112 receives the transmitted document content (at 694), processes the content (e.g., to identify suggestions for the user regarding the content), and then sends a response to the application 216 (at 696), where the response sent is based on the AI processing. The application 216 (at 698) presents a message to the human user (e.g., on a computer display screen) providing the AI-generated suggestions from the generative AI tool at the remote generative AI server 112. The human user 220 (at 699), according to the illustrated implementation, reads and optionally utilizes the information presented in the AI-generated suggestions. In various implementations, if the human user 220 (at 699) utilizes the information presented, the human user 220 may incorporate some or all of the suggestion provided.

After the generative AI option is enabled (at 688/690), the endpoint agent 204 periodically rechecks the document content for sensitive information (at 686). Each recheck (at 686) may involve following a process like the one that starts at 670 and 672 in the illustrated flowchart. A change in document status (e.g., from not containing sensitive information to containing sensitive information) may be warranted in subsequent rechecks (at 686) due to the human user, for example, editing the document to add in sensitive information. At that point, the endpoint device 102*a* disables the in-line generative AI functionality (at 688). The periodic rechecks (at 686) may be performed, for example, automatically at specific time intervals, in response to edits (e.g., content addition) having been made to the document, and/or in response to a user initiating the recheck. If operating in a Visual Studio IDE, and if the periodic rechecks (at 686) are performed in response to content being added to the document, the endpoint agent 204 may (at 686) be informed of any new content additions by OutputWindowEventsClass.PanelUpdated Event, which occurs whenever new text is added to a pane in an output window, for example. (See, e.g., learn.microsoft.com/en-us/dotnet/api/envdte.outputwindoweventsclass.paneupdated?view=visualstudiosdk-2019&viewFallbackFrom=visualstudiosdk-2022, the Visual Studio IDE website). The endpoint agent will be able periodically to get all the in-line input.

Thus, in view of the foregoing, it can be seen that, in an exemplary implementation, upon document opening, the endpoint agent scans (or has scanned) the document content, a comparison is made between detectors (e.g., information in the document) and a detection policy (e.g., in computer memory that includes rules that establish which detectors, if found, should block the content from being transmitted to a remote AI server). If blocking is deemed appropriate, then the approach may use an application programming interface (API) to disable in-line suggestions for a currently open document. Detecting a paste event in the document or any other document modifications will cause the endpoint agent to scan (or initiate a scan) again and the in-line suggestions can be disabled later if the document becomes sensitive because of additional modifications. In addition, if a remote AI agent is accessible through a chat interface too (in addition to in-line suggestions), then the endpoint agent will operate as indicated above (with reference to the discussion of a chat interface to an AI agent). In those instances, the endpoint agent may monitor the chat interface for any dialog. In those instance, the mere inclusion of sensitive information in the document itself will not cause the chat interface to become disabled. However, if the submit button on the chat interface is pressed (or an equivalent action is taken), then the transmission will be at least temporarily disabled while the content of the text interface is scanned for sensitive information, as determined based on a policy stored in computer memory. If there is no sensitive information in the content that would be transmitted to the remote AI server, then the submit action can be resumed and an AI generated response will be provided for the specific submission.

Figure 5:
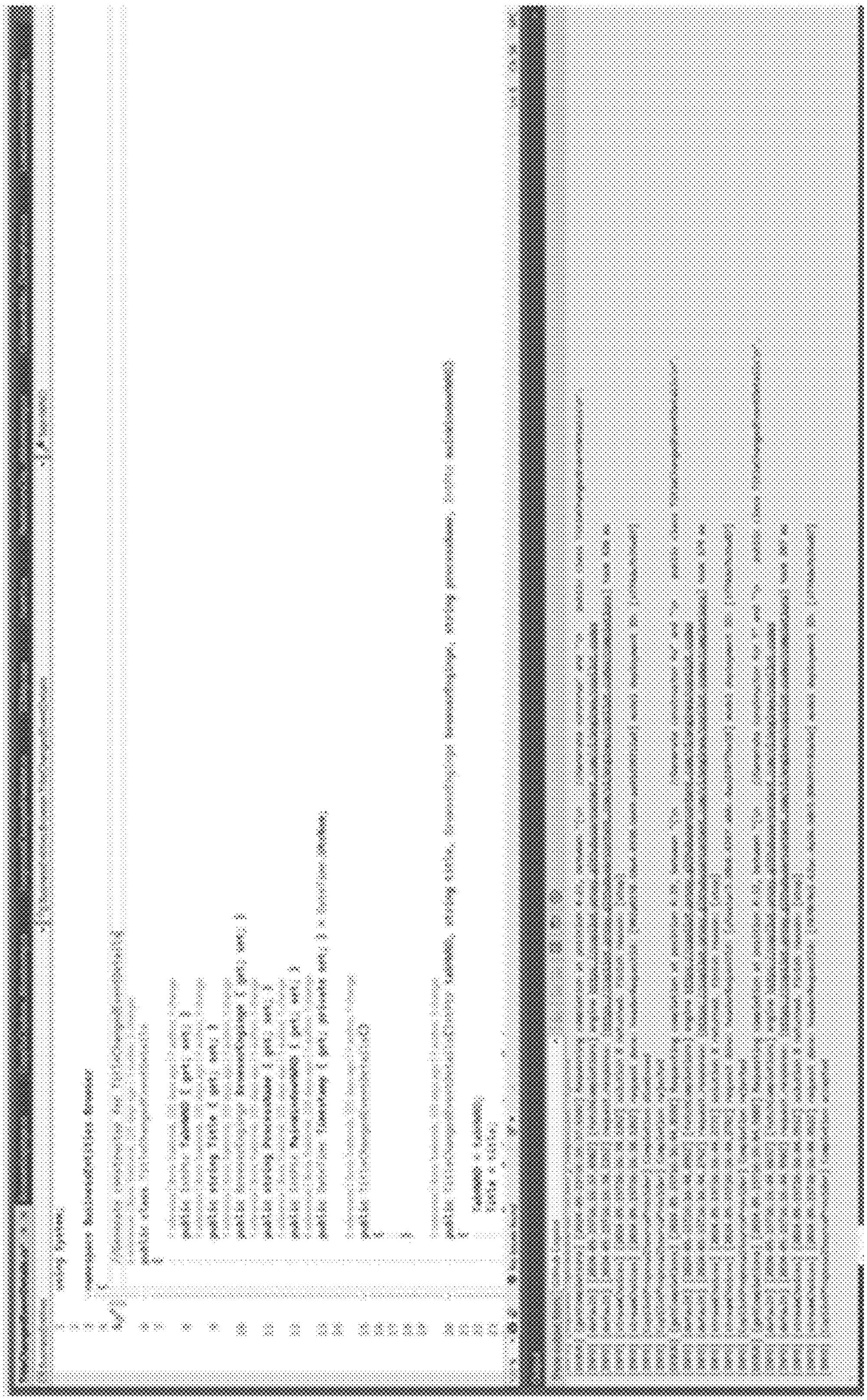
FIG. 5 is an exemplary screenshot from an endpoint device in the computer network of FIG. 1.

FIG. 5 is an example of a screenshot showing an exemplary user interface 550 that may appear on one of the endpoint devices (e.g., 102*a*) in the computer system 100 of FIG. 1. The user interface 550 represented in the figure is running the Visual Studio® Code application with an application (e.g., the GitHub Copilot® application) configured to provide in-line suggestions. Blurred text is shown in the illustrated screenshot. The text is deliberately blurred in the figure. This reflects that text can be present in those locations, but the specifics of the blurred text are not important to the discussion that follows. The exemplary user interface 550 is one example of what a human user might see (e.g., on a computer display screen) while the process of FIG. 6 is being performed.

The illustrated screenshot has a coding field 552 that enables a human user (e.g., at a human-machine interface) to enter and/or edit computer executable code for a web, desktop or mobile application under development. The coding field 552 in the illustrated example is populated with blurred text that represents an exemplary collection of such computer executable code. The application is configured to present the user with AI-generated input and/or feedback within the coding field.

Operationally, a human user interacting with the illustrated screenshot may enter computer code into the coding field 552. If, at some point, the human user has a question about the code being created, or how to code a particular functionality, or anything else that a generative AI coding tool may be able to assist with, the human user may enter an AI prompt directly into the coding field 552 and, as long as the content in the document showing in the coding screen (i.e., the substantive code being created by the human user and any prompt entered there by the user) does not include sensitive information, receive a response to the AI prompt, on screen, also within the coding field. Also, as long as the content in the document is not deemed to contain sensitive information, then the application, at times, may, on its own (e.g., without a specific user prompt) provide AI-generated input on the content of the document being produced. If the endpoint device, on the other hand, determines that sensitive information is present in the content of the document on the user interface, then the in-line AI suggestions functionality will be disabled until and unless the document content is later changed to remove any sensitive information and the endpoint agent determines that sensitive information is no longer present.

Generative AI Access Via Web Browser

Remote AI tools, and websites of various kinds, can be accessed via a web browser. In some instances, information conveyed from an endpoint device where the user is located to such remote AI tools, for example, can contain sensitive information. What follows is a description of a system and process for preventing the sharing of sensitive information to such remote AI tools and potentially other websites via web browser. To be clear, the systems and processes disclosed here are applicable to situations where a web browser is used to access a remote AI tool but can be applied to situations where a web browser is used to access (and potentially share information with) a remote AI tool at a website (e.g., ChatGPT.com) or a variety of other web-based network resources (e.g., social media websites, etc.) accessible with a web browser. In a typical implementation, the systems and processes disclosed here block transmissions to such websites if they include sensitive information. The blocking is done at the browser (e.g., not at the UI, which is where other systems and techniques, described above, block the movement of sensitive information).

Figure 7A:
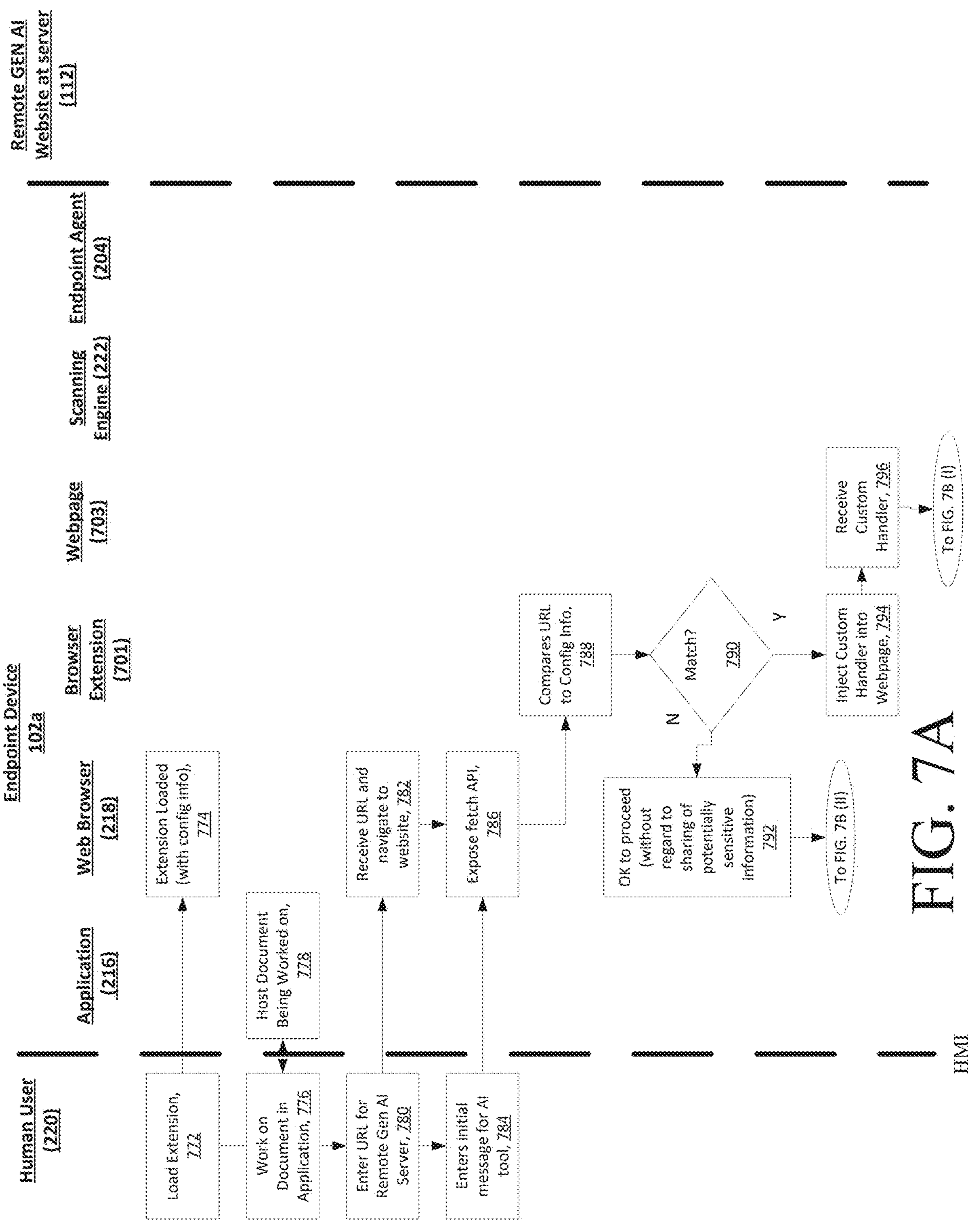
FIGS. 7A and 7B are a flowchart representing an implementation of yet another process that may be performed in and with the exemplary computer network of FIG. 1.
Figure 7B:
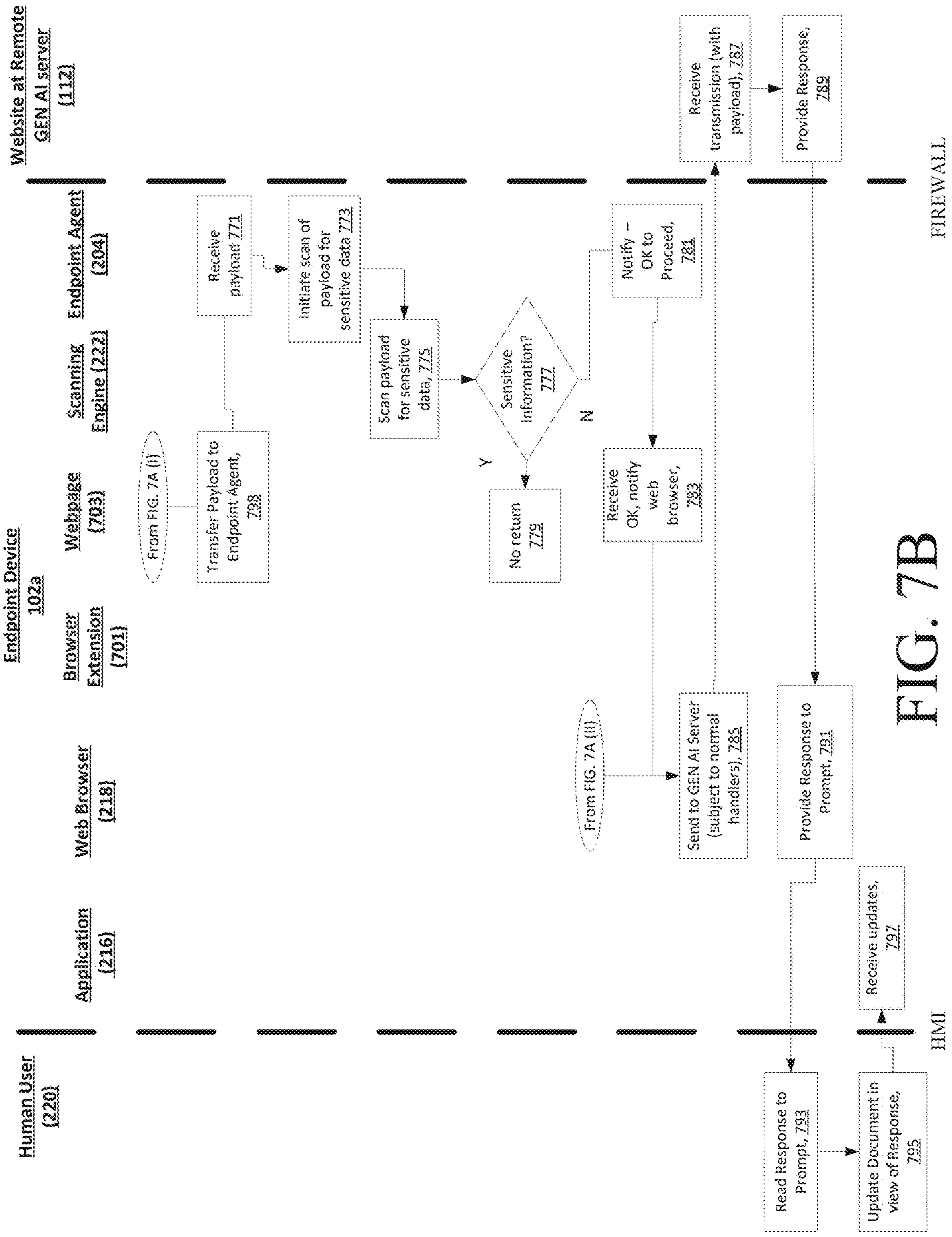

FIGS. 7A and 7B show a flowchart that represents a process for preventing transmittals that include sensitive information to a remote AI tool at a remote generative AI server 220 using a web browser. The foregoing processes may be implemented in a variety of different ways. FIGS. 7A and 7B is a flowchart representing one exemplary implementation thereof. The process includes steps performed by a human user 220, steps performed by an endpoint device 102*a* on a computer network 100, and steps performed by a remote (relative to the endpoint device 102*a*) generative AI server 112. Each of the steps performed by the endpoint device 102*a* in the illustrated implementation is performed by either an application 216, a web browser 218, a browser extension 220, a webpage 701, the scanning engine 222, or the endpoint agent 204. The steps performed by the human user 220 are performed through interactions involving one or more human-machine interfaces (e.g., keyboard, mouse, display screen, etc.) coupled to the endpoint device 102*a*. A firewall 103 is between the endpoint device 102*a* and the remote AI server 112, which hosts the website (e.g., chatgpt.com) that hosts a generative AI tool.

The process represented in the illustrated implementation begins (at 772) with the human user 220 loading an extension into the web browser 218. In an exemplary implementation, the extension includes, for example, configuration information that identifies specific websites and web resources to which the web browser 218 should prevent the transmission of sensitive information. In some implementations, the web resources identified in the configuration information may include, for example, the uniform resource locator (URL) for one or more websites that provide access to generative artificial intelligence tools. The web browser 218 (at 774) receives the extension with the configuration information (at 774).

Although this is not a requirement of the process, the human user 220 (at 776) in the illustrated implementation may be working on a document that is being hosted in the application 216, which may be, for example, the Visual Studio® application. The user 220, working on the document (e.g., computer code) in the application 216, may reach a point where input or feedback from a generative AI tool accessible through a web browser (e.g., at website 112) may be desired. The user 220 (at 778) clicks into or otherwise accesses the web browser 218, enters a uniform resource locator (URL) for the desired resource (e.g., a generative AI tool at a website) into the address bar of the web browser 218, and causes the web browser to navigate to the website (at 112). The web browser 218 (at 780) receives the URL and navigates to the website (at 782). In an exemplary implementation, the web browser 218 loads a webpage from the website on a display of the endpoint device 102*a* and the webpage 701 illustrated there may include a dialogue box to facilitate an exchange of messages between the human user and the AI tool from the website. The dialogue box may include an initial message or greeting from the AI tool to the human user, such as “Hi there! How can I assist you today?” The human user 200 (at 784) may respond to the initial message from the AI tool with a typed response, for example, such as “Hello” coupled with a query (or prompt) for the generative artificial intelligence tool at the website.

In response to the human user entering the response (with the prompt), and prior to the response being transmitted to the generative artificial intelligence tool (at server 112), the web browser 218 (at 786) exposes a fetch application programming interface (API) and calls the handlers involved in executing a fetch for the web browser 218. Next (at 788), the browser extension 701 compares the URL of the website entered into the web browser 218 (at 780/782) to the configuration information previously loaded into the web browser (at 772, 774) with the browser extension 701. The configuration information typically identifies one or more URLs for websites of interest (i.e., websites to which the transmission of sensitive information may be of concern, e.g., something to be prevented). More specifically, the browser extension 701 (at 788) determines whether the URL entered into the web browser 218 (at 780/782) corresponds to (e.g., matches) any of the URLs provided with the configuration information (and stored in memory). In an exemplary implementation, the browser extension 701, in this regard, takes into consideration at least two pieces of configuration information (e.g., at 788): 1) domain information (e.g., what domains to consider injecting into—e.g., ChatGPT.com), and 2) the signature of the API of interest in this regard (e.g., chatgpt.com/backend-anon/conversation). In some implementations, the system overwrites fetch and the website (at server 112) may call fetch (to the endpoint device 102*a*). At that point, the endpoint device 102*a* tries to match the target (because fetch always includes a request object that contains a destination) and inspect whether that matches the signature of the API that is serving the request. In some implementations, only if those match, does the endpoint agent 102*a* proceed.

Referring back to the illustrated flowchart, if the browser extension 701 determines (at 790) that the URL entered into the web browser 218 (at 780/782) does not correspond to any of the URL information provided with the configuration information, then browser extension 701 notifies the web browser 218 (at 792) that it is ok to proceed normally, at which point, the process continues in FIG. 7B, which includes accessing the remote website (e.g., at 112) without further regard to checking for sensitive information in the corresponding data transmissions. If, however, the browser extension 701 determines (at 790) that the URL entered into the web browser 218 (at 780/782) does correspond to one of the URLs in the URL information provided with the configuration information, then browser extension 701 proceeds to inject a custom handler into the corresponding webpage 703 (at 794). In a typical implementation, the injection of the custom handler (at 794) occurs at the endpoint device 102*a*. The illustrated process shows the webpage 703 receiving the custom handler (at 796). The custom handler, in a typical implementation, is a segment of computer readable code stored on a computer-readable storage medium and configured such that, when executed by a computer processor, causes the computer processor to perform functionalities associated with the custom handler and/or the webpage 703 that includes the custom handler.

In a typical implementation, the browser extension is generally configured to ask for and get access to every website it attempts to access. Inside the extension code itself, as discussed below, the extension does look for specific domains (e.g., chatgpt.com). That is part of its configuration. If, for example, the extension determines that a particular designated domain, among a collection of domains, is being accessed, it will inject a custom handler. For any other websites, nothing is injected. In those instances, the browser extension simply looks at the domain.

Next (and before any information leaves the endpoint device 102*a* bound for the website (at 112)), the webpage 703 (with the custom handler) transfers the payload of the intended post request to the endpoint agent 204. In a typical implementation, the payload of the intended post request includes substantive information, such as the data enclosed in the body of the human's response to the initial greeting from the AI tool (e.g., the payload may include, for example, the substantive textual portion of the human user's "Hello" response to the initial message from the AI tool, along with any generative artificial intelligence prompt the user may have entered as well.) In various implementations, the payload may include other information (e.g., metadata regarding the payload as well (e.g., author, content type, conversation mode, and other metadata). The custom handler, in a typical implementation, causes this transfer (at 798) by the webpage 703 (on the endpoint device 102*a*) to take place.

In a typical implementation, the webpage 703, when attempting to perform a function (e.g., a post request) that could involve the potential transfer of sensitive information to a website using the web browser 218, calls the custom handler (and any other handlers ordinarily involved in such processes) to perform their associated functions. The webpage 703 is configured such that the associated function (e.g., the post) will only be executed if the custom handler and every other handler involved in the associated function (i.e., the post) returns the call to the webpage 703. More specifically, receiving a call back from all of the handlers (custom and otherwise) is a prerequisite to the web browser 218 performing the post function (and transferring the payload to the AI tool on server 112). Unless all of the handlers, including the custom handler and all other handlers involved in the associated function (e.g., the post), return the call (with none of them indicating that the function should not or cannot be performed), then the associated function (e.g., the post) will not be performed and no information from the payload will be transmitted to the generative AI tool at server 112 by the web browser 218. Therefore, executing the post is contingent on the custom handler (and any other handlers involved in the post request) returning the post request.

The endpoint agent (204) receives the payload from the webpage 703 (at 771). The endpoint agent 204 then (at 773) initiates a scan of the payload for sensitive information. The scanning engine 222 (at 775) scans/analyzes the payload for sensitive information. The payload can be scanned (at 775) in any number of a variety of ways. Some of these ways were discussed above in reference with the discussion of step 468.

Depending on the outcome of the scan, the scanning engine 222 (at 777) determines whether the payload contains any sensitive information and, thus, whether it is ok (i.e., acceptable) to transmit the payload to the generative AI tool at the website (on server 112). If the scanning engine 222 (at 777) determines that sensitive information is present in the payload, then the endpoint device 102*a* does not transmit any of the content to the generative AI tool at the website (at 112). In that case, the endpoint agent 204 takes steps to ensure that no return is provided (e.g., from the custom handler to the webpage 703, at 779). In that case, the post request will remain pending and the post will not be executed, even if the other handlers involved in the post request returned/responded to the webpage 703. As mentioned above, the payload may contain, for example, substantive text (e.g., prompts, requests, etc.) and associated metadata. In a typical implementation, the system examines the entire payload for sensitive information (at 777).

In that circumstance, the endpoint agent 204, for example, may present on a display of the endpoint device 102*a* a fail message to the human user indicating that the action (e.g., the post request) has been blocked and, potentially, inform the user that the action was blocked because the message potentially contains sensitive information. In some implementations, the endpoint agent may cover the webpage 703 on the user interface with a visual covering (e.g., a blue rectangle that covers at least the substantive portions of the webpage visual on the display screen) while the fail message is being displayed to the user. This is because, at the same time the fail message is being displayed, the underlying webpage 703 may be producing its own failure message. The visual cover prevents the failure message from the webpage 703 from being visible while the fail message from the endpoint agent is being displayed. This avoids creating a situation with more than one fail message on screen simultaneously, which might be confusing to the user. In a typical implementation, after some period of time (e.g., 2-15 seconds, or after the user has acknowledged the fail message from the endpoint agent (e.g., by clicking on an "ok" button), the endpoint agent 204 causes the underlying webpage to perform a refresh so that a screen appears to the user that the user can continue to interact with.

If the scanning engine 222 (at 777) determines that the just opened document does not include sensitive information, then the endpoint agent 204 (at 781) notifies the custom handler on the webpage that it is ok to proceed and, in response, the custom handler returns to the webpage (e.g., indicating the requested function, that is the post request, can proceed, subject to affirmation from all other handlers involved in executing the requested function). The custom handler and the webpage receive the ok-to-proceed notification at 783. At that point, the web browser 218 is free to (and, subject to affirmation from all other handlers involved in executing the requested function, does) execute the requested function which includes transmitting its payload to the trained generative AI tool at the website (on server 112) (at 785) for processing. The remote generative AI server 112 receives the transmitted document content (at 787), processes the content (e.g., to identify AI-generated suggestions and/or feedback for the user regarding the content), and then sends a response to the web browser 218

(at 789), where the response sent is based on the AI processing. The web browser 218 (at 791) presents a message to the human user (e.g., on a computer display screen) providing the AI-generated suggestions and/or feedback from the generative AI tool to the user. The human user 220 (at 793), according to the illustrated implementation, reads and optionally utilizes the information presented in the AI-generated suggestions. In various implementations, if the human user 220 (at 795) utilizes the information presented, the human user 220 may incorporate some or all of the suggestion provided (at 795/797).

As an alternative (e.g., to the endpoint agent 204) preventing the custom handler from returning to the webpage's function request (at 779) and then producing a notification to the user that the request failed, the endpoint agent 204 may, in some implementations, upon determining that a particular payload includes sensitive information (at 777), the endpoint agent 204 may prevent the custom handler from returning to the webpage's function request (at 779), but then change the payload (e.g., to delete the payload already scanned (at 775) and thereby remove any potentially sensitive information, and adding instead, a prompt requesting the generative AI tool (at server 112) to provide a return message (e.g., that "the request failed because it contained sensitive information" or the like). Then, the endpoint agent 204 would notify the custom handler on the webpage (at 781) that it is ok to proceed and, in response, the custom handler returns to the webpage (e.g., indicating the requested function, that is the post request, can proceed, subject to affirmation from all other handlers involved in executing the requested function). The custom handler and the webpage would receive the ok-to-proceed notification at 783 and the web browser 218 would (subject to affirmation from all other handlers involved in executing the requested function) execute the requested function which would include transmitting the modified version of the payload (requesting the generative AI tool to provide a return message that "the request failed because it contained sensitive information" or the like, to the trained generative AI tool at the website (on server 112) (at 785) for processing. In that case, the generative AI tool would, in a typical implementation, provide the requested message, which would appear to the user on the display screen in the web browser 218 interface.

In some implementations, instead of identifying domains or URLs of interest at 788, the system may utilize a web categorization service to categorize various domains based on function and type of associated web service (e.g., generative AI, mail, social media, etc.). In those instances, the endpoint agent, for example, may be configured to ask (e.g., query) a web categorization service (e.g., one that resides on the endpoint agent 102*a* or elsewhere) for a category of the website, and then base the subsequent determination (e.g., at 790) on whether that particular category is one that matches information provided (which would include webpage categories of interest) with the configuration information (from 774). Any subsequent blocks or permissions to proceed would be conditioned, at least in part, on whether such a match exists.

Figure 8:
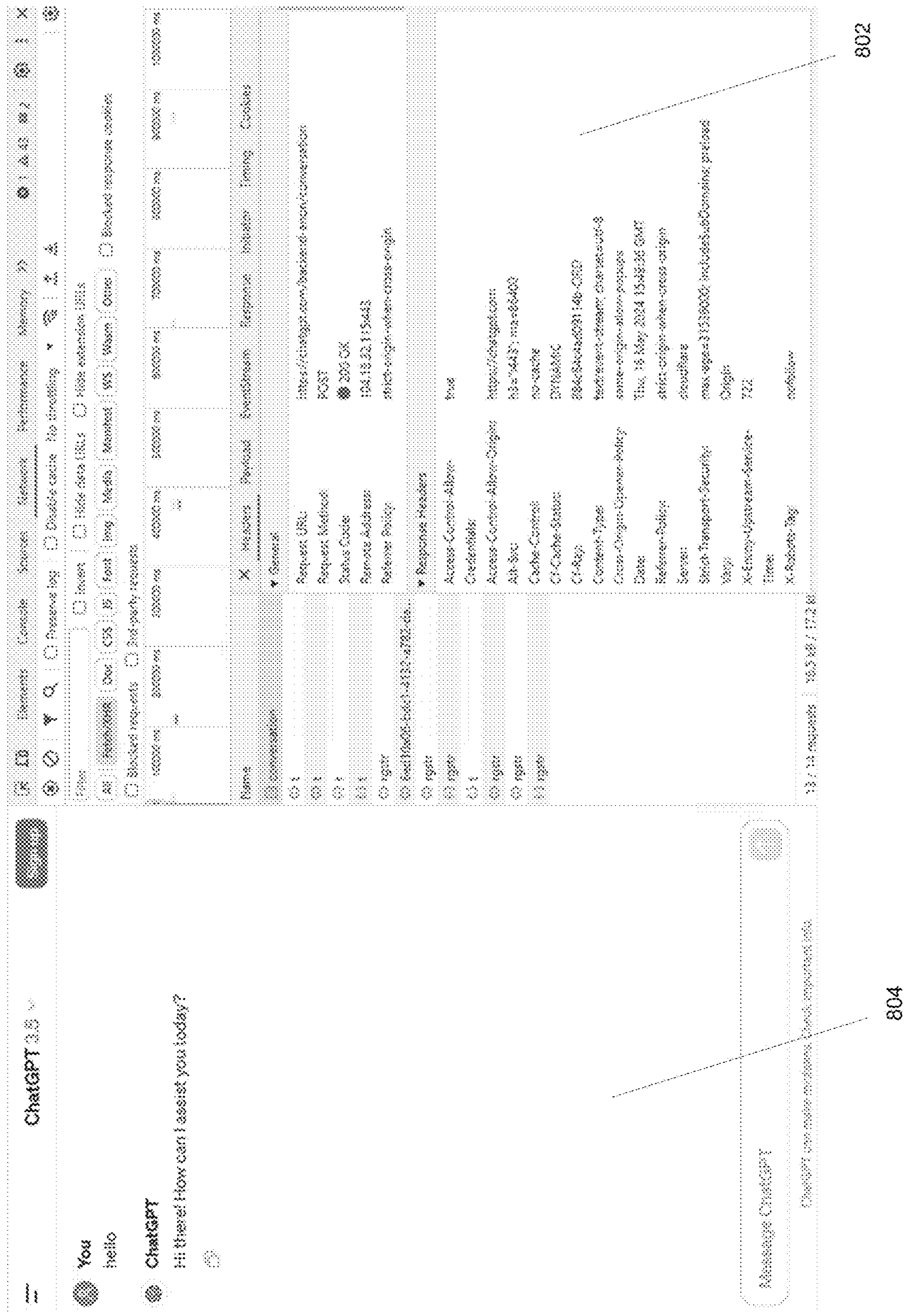
FIGS. 8 to 10 are exemplary screenshots from an endpoint device in the computer network of FIG. 1.
Figure 9:
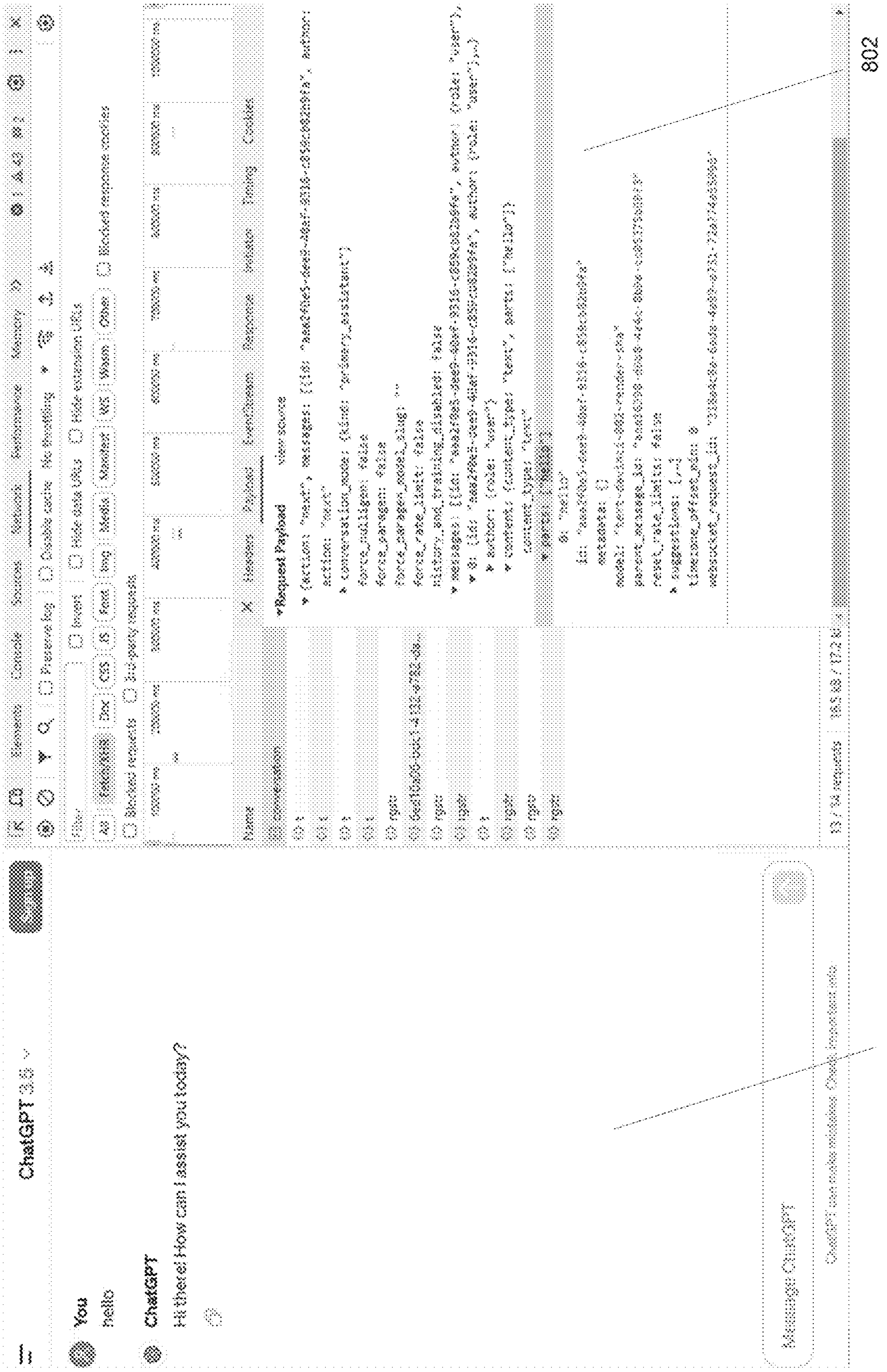
Figure 10:
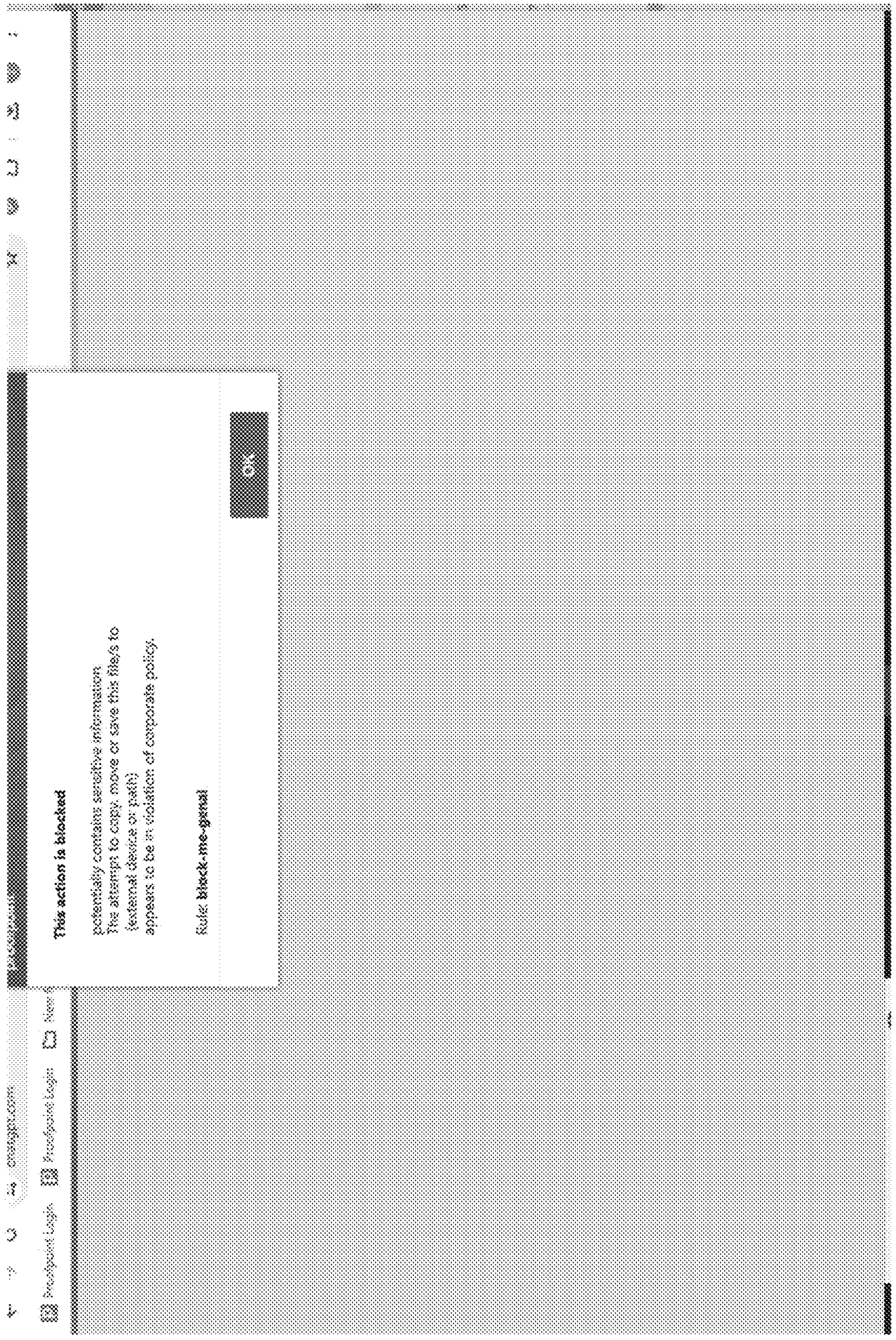

FIGS. 8-10 show a time sequence of screenshots that may appear, for example, on a display screen of an endpoint device (e.g., 102*a* in FIG. 1). The computer application represented in the illustrated screenshots includes a web browser 804 interface that provides access to a remotely located AI tool (e.g., at server 112) to assist a human user who is creating and/or editing computer code in a coding field 802. In FIG. 8, the web browser-based interface 804 has a chat-style feature whereby the AI tool has initiated an exchange with the human user by presenting the onscreen message, "Hi there! How can I assist you today?" The generative AI chat interface is enabled and ready to receive questions/prompts from the user in response to the onscreen message.

Referring to FIG. 9, the user has responded to the generative AI assistant's initial comment, by entering the user response, "hello." The coding portion 802 of the interface shows the payload associated with the user response, with the "parts: ["hello"] line in the coding field 706 highlighted. In a typical implementation, when the user attempts to post that response, the computer system may perform a process consistent with applicable portions of the FIGS. 7A and 7B flowcharts. Since the "hello" response is innocuous (and does not contain anything that could be deemed sensitive information), the result is, as shown in FIG. 9, that the "hello" message is sent to and reaches the website (at server 112). In a typical implementation, the website (e.g., chatgpt.com) would then respond accordingly.

If, however, instead of "hello," the user had entered a message (e.g., "How can I sort these names and social security numbers of our employees who have top secret clearance alphabetically by last name?" followed by a list of names and nine-digit numbers, or something similar) that most likely would include sensitive information, the request would fail as the system, as represented in the screenshot of FIG. 10, would determine that the payload contained sensitive information, and the notification in FIG. 10 would appear on screen notifying the user that "This action is blocked" because the document "potentially contains sensitive information." The specific notification shown in FIG. 10 continues that "The attempt to copy, move, or save this file/s to (external device or path) appears to be in violation of corporate policy." The applicable rule "Rule: block-megenai" also is identified. Notably, the background of the screen (e.g., that might otherwise include some or all the potentially sensitive information) is covered up (i.e., not visible) and the pop-up with the notification is in front of the cover-up.

Figure 11:
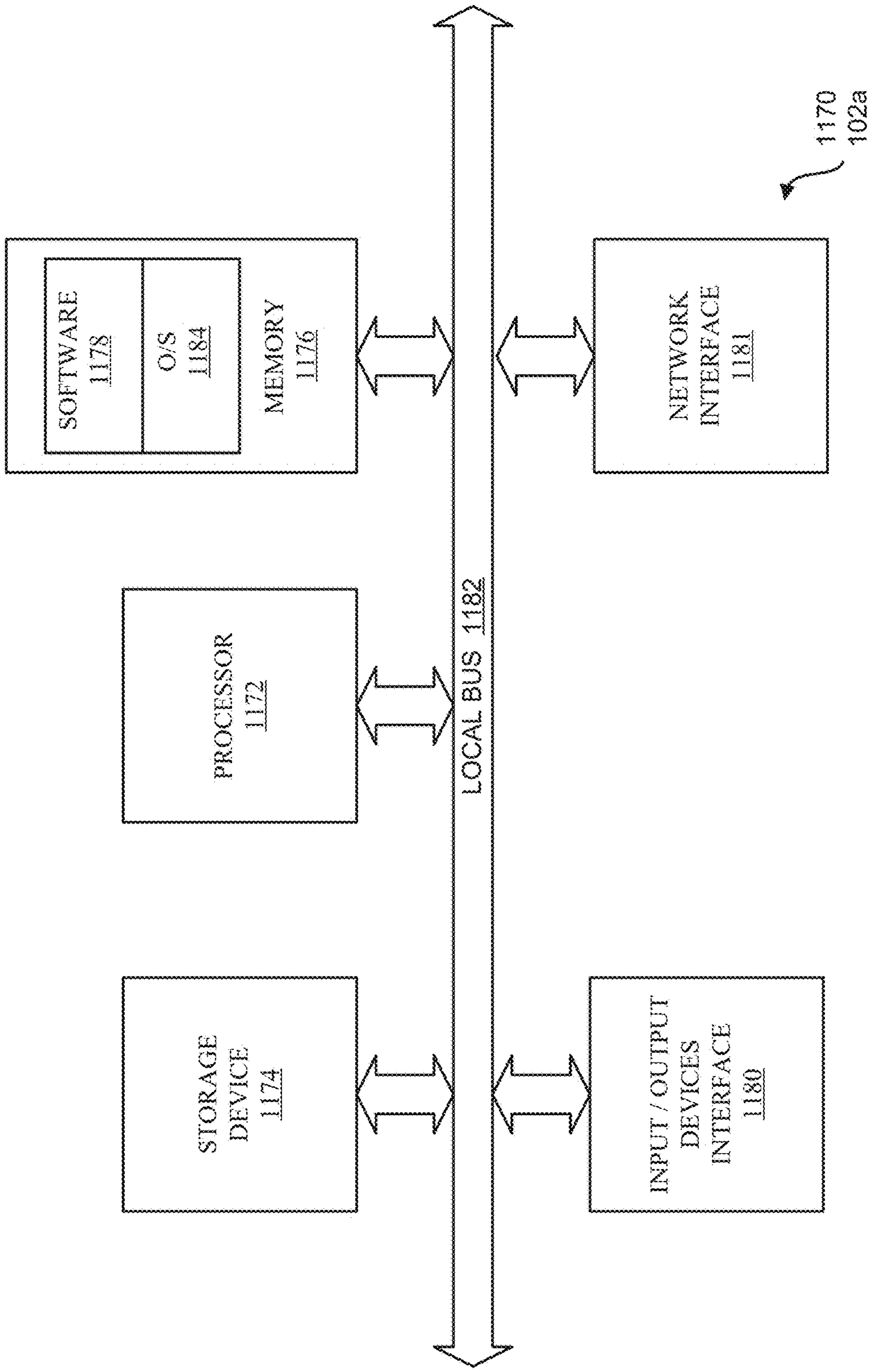
FIG. 11 is a schematic representation showing an exemplary implementation of a computer component from the computer network of FIG. 1.

FIG. 11 is a schematic representation of an exemplary implementation of a computer device 1150 (e.g., endpoint 102*a*) configured to perform some of the computer implemented functionalities disclosed herein, and (in conjunction with other computer devices in the network 100) facilitate other computer-implemented functionalities disclosed herein.

The illustrated computer 1150 has a processor 1172, computer-based memory 1176, computer-based storage 1174, a network interface 1181, an input/output device interface 1180, and an internal bus 1182 that serves as an interconnect between the various subcomponents of the computer 1150. The bus acts as a communication medium over which the various subcomponents of the computer 1150 can communicate and interact with one another.

The processor 1172 is configured to perform the various computer-based functionalities disclosed herein as well as other supporting functionalities not explicitly disclosed herein. In some implementations, some of the computer-based functionalities that the processor 1172 performs may include one or more functionalities disclosed herein as being attributable to a corresponding one of the computer devices on network 100, for example, or disclosed herein. In some implementations, the processor 1172 performs these and other functionalities by executing computer-readable instructions stored on a computer-readable medium (e.g., memory 1176 and/or storage 1174). In various implementations, some of the processor functionalities may be performed with reference to data stored in one or more of these computer-readable media and/or received from some external source (e.g., from an I/O device through the I/O device interface 1180 and/or from an external network via the network interface 1181).

The processor 1172 in the illustrated implementation is represented as a single hardware component at a single node. In various implementations, however, the processor 1172 may be distributed across multiple hardware components at different physical and network locations.

The computer 1170 has both volatile and non-volatile memory/storage capabilities.

In the illustrated implementation, memory 1176 provides volatile storage capabilities. In a typical implementation, memory 1176 serves as a computer-readable medium storing computer-readable instructions that, when executed by the processor 1172, cause the processor 1172 to perform one or more of the computer-based functionalities disclosed herein. More specifically, in some implementations, memory 1176 stores computer software that enables the computer to automatically implement computer functionalities in accordance with the systems and computer-based functionalities disclosed herein.

As shown in the figure, memory stores software 1178 and an operating system 1184.

In a typical implementation, one or more user interface devices (e.g., keyboard, mouse, display screen, microphone, speaker, touchpad, etc.) is connected to the I/O devices interface 1180 to facilitate user interactions with the system.

In various implementations, every computer and/or server and/or other computing device on the network (e.g., 100 in FIG. 1) has the same configuration as the schematically represented computer 1170 in FIG. 11. In some implementations, a computer and/or server and/or other computing device may include fewer (e.g., some subset of the) subcomponents than shown in FIG. 11.

Figure 12:
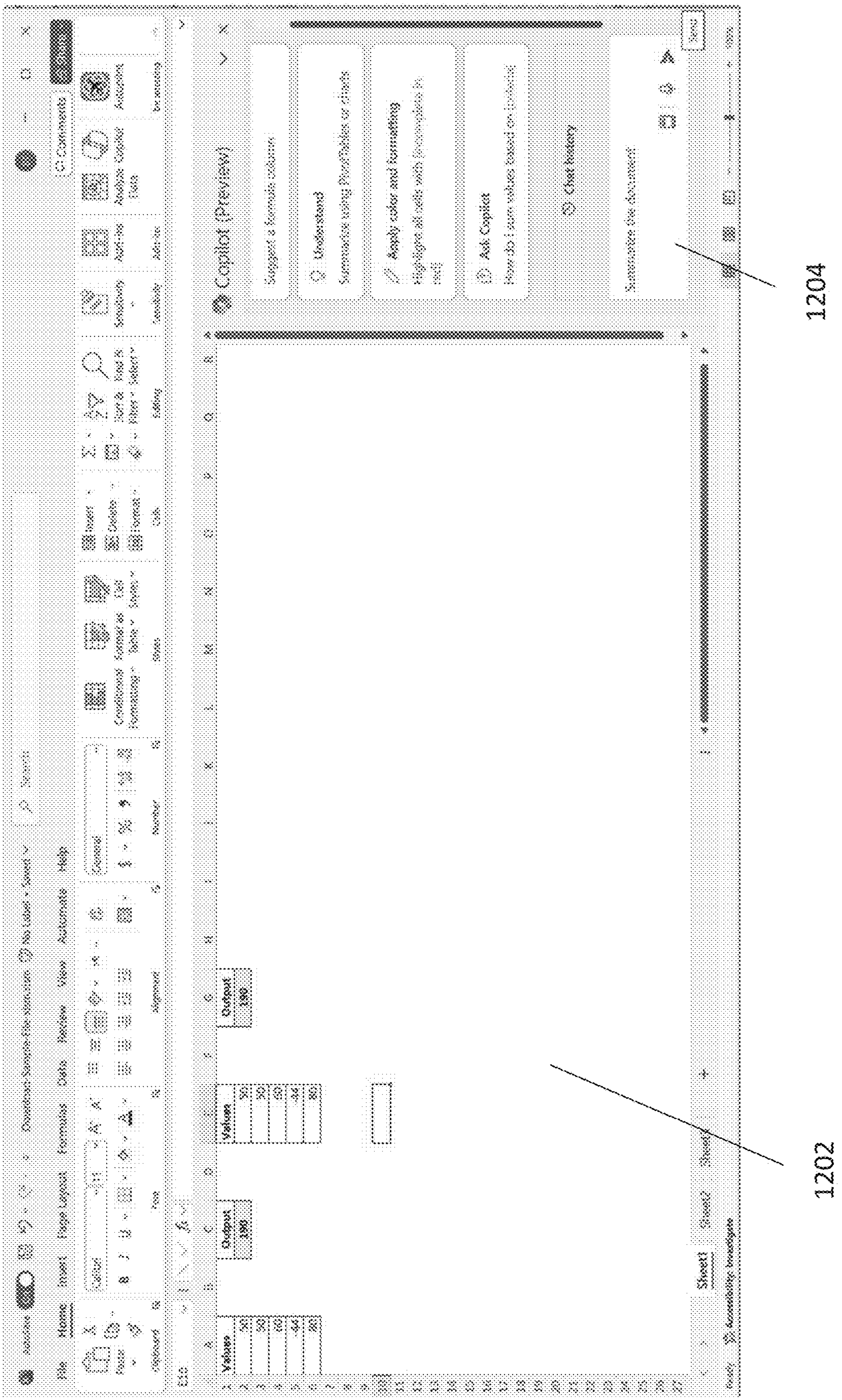
FIG. 12 is an exemplary screenshot from the Microsoft Excel® spreadsheet application with a chat-style interface to a remote generative artificial intelligence tool.
Figure 13:
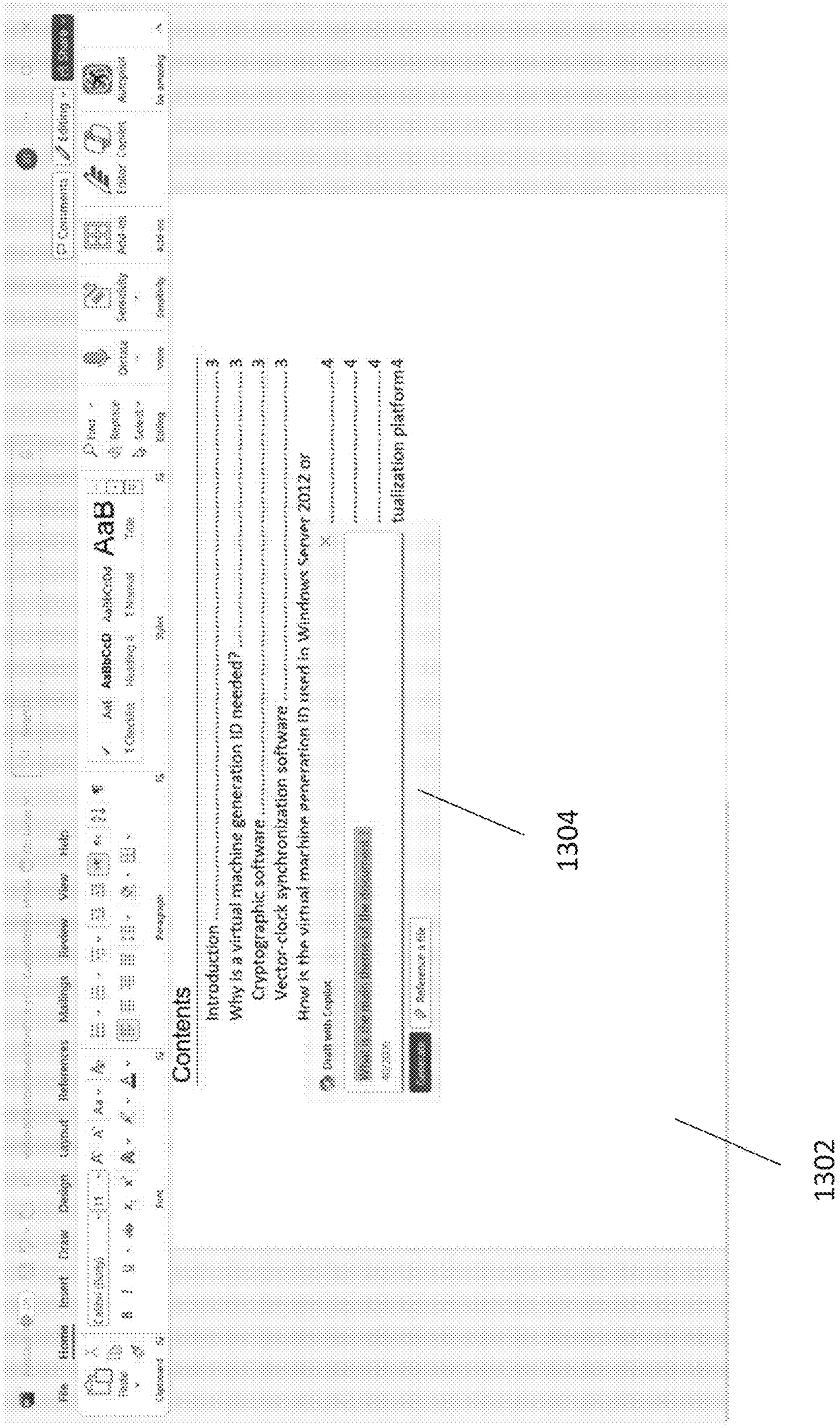
FIG. 13 is an exemplary screenshot from the Microsoft Word® application with a chat-style interface to a remote generative artificial intelligence tool.

The functionalities related to chat-style interfaces are not limited to only Visual Studio. Instead, they are applicable to any computer application that is configured to provide a chat-style interface to a remote generative artificial intelligence tool. Two examples are shown in FIGS. 12 and 13. FIG. 12 is an exemplary screenshot from the Microsoft Excel spreadsheet application. The screenshot shows that the application is configured to provide a work area 1202 and a chat-style interface 1204 to a remote generative artificial intelligence tool next to the work area 1204. The work area 1202 is configured to provide a user with access to standard spreadsheet functionalities, whereas the chat-style interface 1204 enables users to access (subject to the potential restrictions described herein) a remote generative artificial intelligence tool. The chat-style interface 1204, in the illustrated example, is integrated into the user interface for the spreadsheet application itself. Likewise, FIG. 13 is an exemplary screenshot from a word processing application, Microsoft Word, which includes a work area 1302 and a chat-style interface 1304 to a remote generative artificial intelligence tool. The work area 1302 in FIG. 13 is configured to provide a user with word processor functionalities, whereas the chat-style interface 1304 enables users to access (subject to the potential restrictions disclosed herein) a remote generative artificial intelligence tool. The chat-style interface 1304 in the illustrated implementation is generated by the word processing application and appears as a window atop the underlying word processing work area 1302. Similarly, the web-browser-based functionalities disclosed herein are not limited to any particular web browser. In fact, the techniques disclosed herein that relate to a web-browser can be readily applied to/incorporated into virtually any application configured to access a website (e.g., pursuant to a user's instruction).

A number of embodiments of the invention have been described. Nevertheless, it will be understood that various modifications may be made without departing from the spirit and scope of the invention.

For example, the systems and techniques disclosed herein may be deployed on any one of a variety of different computer platforms. For example, in some exemplary implementation, one or more of the systems and techniques disclosed herein may be integrated into and/or deployed in connection with a software-as-a-service (SAAS), Insider Threat Management/Enterprise Data Loss Prevention platform, such as the one provided by Proofpoint, Inc., the applicant of the current filing.

The focus of the discussion provided herein was on text (e.g., textual prompts directed to a remote AI tool), but the systems and techniques need not be so limited. The systems and techniques disclosed herein may be extended, in various implementations, to apply to visual data (e.g., images or video), sound, or other forms of media. Certain implementations of the systems and techniques disclosed herein are described as being integrated into the Visual Studio® Code application with an integrated GitHub Copilot® chat feature. It should be understood, however, that the systems and techniques disclosed herein in this regard may be integrated into virtually any computer-based platform that provides a field within which a human user may create and that has access to a remote AI tool on the creative work being undertaken in the field. Instead of being a code editor, for example, the field at issue may be a computer-implemented word processing document, spreadsheet document, music creation program, art creation program, etc. In each of those instances, the systems and techniques disclosed herein may be implemented as long as there is an interface available for a human user to access a remote AI tool available in conjunction with the associated creative field.

As another example, in various implementations, computer components disclosed herein (e.g., applications, etc.) can be implemented by one or more computer-based processors (referred to herein as a processor) executing computer-readable instructions stored on non-transitory computer-readable medium to perform the associated computer-based functionalities (e.g., the functionalities disclosed herein attributable to a computer). The one or more computer-based processors can be virtually any kind of computer-based processors and can be contained in one housing or distributed at different locations, and the non-transitory computer-readable medium can be or include any one or more of a variety of different computer-based hardware memory/storage devices either contained in one housing or distributed at different locations.

Certain functionalities are described herein as being accessible or activated by a user selecting an onscreen button or the like. This should be construed broadly to include any kind of visible, user-selectable element or other user interactive element.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification (e.g., aspects of those attributable to a computer) can be implemented as operations performed by a data processing apparatus (e.g., a processor/specially programmed processor/computer) on data stored on one or more computer-readable storage devices or received from other sources, such as the computer system and/or network environment described herein. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The systems and techniques may be applied to craft a document that includes, for example, computer code for a computer application, that may be deployed in a number of different ways to produce advantageous real word benefits in any of a variety of potential real world applications. For example, computer code developed utilizing the systems and techniques disclosed herein may be incorporated into any number of different real world devices or systems including, for example, as an application in a mobile computing device (e.g., a smart phone), as software in a control system for an industrial or commercial machine or system, as software to control a manufacturing machine or system, etc. These real world devices, machines, and systems may be configured to execute the computer code in a manner that produces a real world effect, such as aiding a human user with functionalities on a mobile device that entertain and/or ease the human user's life in some manner, performing some industrial or commercial function, such as coordinating actions and efforts, or manufacturing a machine, device, system, chemical composition, etc. Other real world applications are possible as well.

Other implementations are within the scope of claims.

What is claimed is:

1. A computer-implemented method of controlling disclosure of sensitive information while attempting to access a tool hosted at a remote network destination via a chat-style interface, the method comprising:

receiving a notification, at a computer-implemented endpoint agent deployed on an endpoint device, that a submit option has been selected on a chat interface to a tool hosted at a remote network destination;

canceling a transmission of text from the chat interface to the tool hosted at the remote network destination in response to receiving the notification;

obtaining text to be submitted to the tool hosted at the remote network destination from the chat interface;

determining, with a computer-implemented scanning engine, whether the text to be submitted to the tool hosted at the remote network destination from the chat interface contains sensitive information based, at least in part, on content of the obtained text; and depending on an outcome of the determination, either:

enabling transmittal of or automatically submitting the text from the chat interface to the tool hosted at the remote network destination; or preventing the transmittal of the obtained text from the chat interface to the tool hosted at the remote network destination.

2. The computer-implemented method of claim 1, wherein the tool hosted at the remote network destination comprises a generative artificial intelligence tool.

3. The computer-implemented method of claim 2, wherein enabling the transmittal of the text from the chat interface to the generative artificial intelligence tool occurs in response to a determination that the text intended to be submitted to the generative artificial intelligence tool from the chat interface does not contain sensitive information.

4. The computer-implemented method of claim 3, wherein enabling the transmittal of or automatically submitting the text comprises:

sending a signal from the endpoint agent to the chat interface to automatically reselect the submit option, without involvement from a human user, wherein the chat interface is configured to automatically reselect the submit option and transmit the text from the chat interface to the generative artificial intelligence tool in response to receiving the signal from the endpoint agent to automatically reselect the submit option.

5. The computer-implemented method of claim 4, wherein the generative artificial intelligence tool is configured to receive text transmitted by the chat interface, generate feedback in response to the transmitted text, and transmit a response to the chat interface based on the generated feedback.

6. The computer-implemented method of claim 5, further comprising:

receiving one or more updates to a document in a computer application on the end point device, via one or more human machine interfaces, wherein the one or more updates are based upon, or incorporate one or more portions of, the response.

7. The computer-implemented method of claim 2, wherein preventing the transmittal of text from the chat interface to the generative artificial intelligence tool occurs in response to a determination that the text intended to be submitted to the generative artificial intelligence tool from the chat interface contains sensitive information.

8. The computer-implemented method of claim 2, wherein preventing the transmittal of the text from the chat interface to the generative artificial intelligence tool comprises:

leaving the transmission of text from the chat interface to the generative artificial intelligence tool in a canceled state.

9. The computer-implemented method of claim 8, further comprising storing the text from the chat interface in cache.

10. The computer-implemented method of claim 8, further comprising:

sending a notification, with the endpoint agent, that the text from the chat interface has been blocked from being submitted to the generative artificial intelligence tool.

11. The computer-implemented method of claim 2, further comprising:

storing data, in computer-based memory, defining one or more rules for determining whether a particular section of text includes sensitive information.

12. The computer-implemented method of claim 11, wherein the scanning engine is configured to apply the one or more rules in the computer-based memory to determine whether the text intended to be submitted to the generative artificial intelligence tool from the chat interface contains sensitive information.

13. The computer-implemented method of claim 2, wherein the endpoint device is within an organization's private network and wherein the generative artificial intelligence tool is hosted by one or more servers at the remote network destination outside of the organization's private network.

14. A system comprising:

a computer comprising:

a computer processor; and computer-based memory operatively coupled to the computer processor, wherein the computer-based memory stores computer-readable instructions that, when executed by the computer processor, cause the computer to control disclosure of sensitive information while attempting to access a tool hosted at a remote network destination via a chat-style interface, by a computer-implemented method comprising:

receiving a notification, at a computer-implemented endpoint agent deployed on the computer, that a submit option has been selected on a chat interface to the tool hosted at the remote network destination;

canceling a transmission of text from the chat interface to the tool hosted at the remote network destination in response to receiving the notification;

obtaining text intended to be submitted to the tool hosted at the remote network destination from the chat interface;

determining, with a computer-implemented scanning engine, whether the text intended to be submitted to the tool hosted at the remote network destination from the chat interface contains sensitive information based, at least in part, on content of the obtained text; and depending on an outcome of the determination, either:

enabling transmittal of the text from the chat interface to the tool hosted at the remote network destination; or preventing the transmittal of the obtained text from the chat interface to the tool hosted at the remote network destination.

15. The computer system of claim 14, wherein the tool hosted at the remote network destination comprises a generative artificial intelligence tool.

16. The computer system of claim 15, further comprising:

one or more servers hosting the generative artificial intelligence tool, wherein the computer is an endpoint device within an organization's private network and wherein the generative artificial intelligence tool is hosted by the one or more servers at the remote network destination outside of the organization's private network, and wherein the generative artificial intelligence tool is configured to receive text transmitted by the chat interface, generate feedback in response to the transmitted text, and transmit a response back to the chat interface based on the generated feedback.

17. The computer system of claim 14, wherein the computer-based memory stores further computer-readable instructions that, when executed by the computer processor, cause the computer to:

execute an application that enables creating and editing a document, wherein the computer receives one or more updates to the document via one or more human machine interfaces of the computer, wherein the one or more updates are based upon, or incorporate one or more portions of, the response.

18. A non-transitory computer readable medium having stored thereon computer-readable instructions that, when executed by a computer-based processor, cause the computer-based processor to controlling disclosure of sensitive information while attempting to access a tool hosted at a remote network destination via a chat-style interface with a process comprising:

receiving a notification, at a computer-implemented endpoint agent deployed on an endpoint device, that a submit option has been selected on a chat interface to a tool hosted at a remote network destination;

canceling a transmission of text from the chat interface to the tool hosted at the remote network destination in response to receiving the notification;

obtaining text intended to be submitted to the tool hosted at the remote network destination from the chat interface;

determining, with a computer-implemented scanning engine, whether the text intended to be submitted to the tool hosted at the remote network destination from the chat interface contains sensitive information based, at least in part, on content of the obtained text; and depending on an outcome of the determination, either:

enabling transmittal of the text from the chat interface to the tool hosted at the remote network destination; or preventing the transmittal of the obtained text from the chat interface to the tool hosted at the remote network destination.

* * * * *